(12) United States Patent
Khaled et al.

(10) Patent No.: US 9,708,546 B2
(45) Date of Patent: Jul. 18, 2017

(54) METHOD FOR REMOVING SULFUR COMPOUNDS FROM A HYDROCARBON FLUID USING AN ADSORBENT

(71) Applicant: KING FAHD UNIVERSITY OF PETROLEUM AND MINERALS, Dhahran (SA)

(72) Inventors: Mazen Mohammad Khaled, Dhahran (SA); Mazen Khaled Nazal, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 158 days.

(21) Appl. No.: 14/927,107

(22) Filed: Oct. 29, 2015

(65) Prior Publication Data

US 2017/0121611 A1    May 4, 2017

(51) Int. Cl.
*C10G 25/00* (2006.01)
*C10G 67/02* (2006.01)
*C10G 67/12* (2006.01)
*C10G 67/06* (2006.01)

(52) U.S. Cl.
CPC .......... *C10G 25/003* (2013.01); *C10G 25/006* (2013.01); *C10G 67/02* (2013.01); *C10G 67/06* (2013.01); *C10G 67/12* (2013.01)

(58) Field of Classification Search
CPC ...... C10G 25/003; C10G 25/09; C10G 25/12; C10G 67/06
See application file for complete search history.

(56) References Cited

U.S. PATENT DOCUMENTS

| | | | | |
|---|---|---|---|---|
| 3,943,226 A * | 3/1976 | Difford | | B01D 53/60 423/240 S |
| 4,914,070 A | 4/1990 | Ledoux et al. | | |
| 8,323,480 B2 | 12/2012 | Choi | | |
| 8,747,786 B2 | 6/2014 | Visser et al. | | |
| 2003/0070990 A1 * | 4/2003 | Rohrbach | | B01D 37/025 210/668 |
| 2005/0205469 A1 * | 9/2005 | Klabunde | | C10G 25/003 208/208 R |
| 2008/0135454 A1 * | 6/2008 | Choi | | B01J 20/08 208/248 |
| 2011/0024330 A1 * | 2/2011 | Choi | | B01J 20/08 208/210 |
| 2013/0224483 A1 * | 8/2013 | Muramatsu | | C01B 31/0226 428/367 |
| 2014/0070434 A1 * | 3/2014 | Visser | | C01G 43/01 423/261 |

OTHER PUBLICATIONS

Srivastav, A., et al., "Adsorptive Desulfurization by Activated Alumina", Journal of Hazardous Materials, pp. 1133-1140, (2009).
Yu, C., et al., "Adsorptive Removal of Thiophenic Compounds from Oils by Activated Carbon Modified with Concentrated Nitric Acid", Energy & Fuels, pp. 1499-1505, (2013), American Chemical Society.
Moosavi, E.S., et al., "Adsorption of Thiophenic Compounds from Model Diesel Fuel Using Copper and Nickel Impregnated Activated Carbons", Energies, pp. 4233-4250, (2012).
Yang, X., et al., "Sol-Gel Cu—Al2O3 Adsorbents for Selective Adsorption of Thiophene out of Hydrocarbon", Industrial & Engineering Chemistry Research, vol. 45, No. 18, pp. 6169-6174, (2006).
Etemadi, O., "Selective Adsorption in Ultrasound Assisted Oxidative Desulfurization Process with Nano-Engineered Adsorbents: Mechanism and Characterization", URL: http://gradworks.umi.com/32/62/3262684.html, pp. 1-4, (2007).
U.S. Appl. No. 14/836,560, filed Aug. 26, 2015, Khaled et al.

* cited by examiner

*Primary Examiner* — Michelle Stein
(74) *Attorney, Agent, or Firm* — Oblon, McClelland, Maier & Neustadt, L.L.P.

(57) ABSTRACT

A method of removing sulfur compounds from a hydrocarbon fluid. The method includes contacting the hydrocarbon fluid with an adsorbent comprising a carbonaceous material doped with nanoparticles of uranyl oxide ($UO_3$) to reduce the concentrations of the sulfur compounds. The carbonaceous material is at least one selected from the group consisting of activated carbon and carbon nanotubes, and the adsorbent has a weight ratio of C to U in the range from 9:1 to 17:1, and a weight ratio of C to O in the range from 5:1 to 13:1.

20 Claims, 24 Drawing Sheets

METHOD FOR REMOVING SULFUR COMPOUNDS FROM A HYDROCARBON FLUID USING AN ADSORBENT

BACKGROUND OF THE INVENTION

Technical Field

The present disclosure relates to the field of methods for removing sulfur compounds from a hydrocarbon fluid or fuel. More specifically, the present disclosure relates to a method of removing sulfur compounds from a hydrocarbon fluid using an adsorbent comprising a carbonaceous material, preferably activated carbon and carbon nanotubes, doped with nanoparticles of uranyl oxide ($UO_3$).

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly nor impliedly admitted as prior art against the present invention.

Hydrocarbon fluids, i.e. hydrocarbon liquids and/or gases, form the bulk of most fossil fuels that also contain sulfur compounds. In jet fuel, the sulfur compounds include thiophene, benzothiophene (BT) and its derivatives. In marine gas oil, a naval logistic fuel, the sulfur compounds are mainly dibenzothiophene (DBT) and its derivatives. In diesel fuel, the major sulfur compounds are BT, alkyl-benzothiophene (alkyl-BT), DBT, and alkyl-dibenzothiophene (alkyl-DBT). The bulk of diesel fuel includes mainly saturated and aromatic hydrocarbons. Saturated hydrocarbons include n-paraffins, isoparaffins, and cycloparaffins (naphthenes). Aromatic compounds are mainly alky-benzenes, indanes, naphthalenes, tetralins, biphenyls, acenaphthenes, fluorines, acephenanthrenes, phenanthrenes, anthracenes, and naphthenophenanthrenes. Sulfur compounds comprising DBT and its derivatives are also present in used motor oil, since the sulfur compounds from fuels deposit on gas or diesel engines and increase wear of the engines.

In industrial and automobile waste gases, the sulfur compounds convert to $SO_2$ and $SO_3$ that produce acid rain. Additionally, the sulfur compounds in fossil fuels are adsorbed into catalytic converters and occupy the sites designed for CO, NO, and $NO_2$ reduction, decreasing the reduction efficiency of and causing harm to the catalytic converters. As a result, removal of sulfur compounds from fossil fuels, particularly diesel fuel, is important for protecting the environment and eliminating the financial loss in products such as catalytic converters.

The European regulation required the sulfur content in diesel to be reduced from 2000 ppmw in 1993 to 50 ppmw in 2005 and to 10 ppmw in 2009. The U.S. Environmental Protection Agency required the sulfur content in highway diesel to be reduced from 500 ppmw to 15 ppmw in 2006. In 2012, non-road diesel fuel used in locomotive and marine applications was required to meet the 15 ppmw standard.

Common desulfurization techniques for diesel include hydrodesulfurization (HDS), biodesulfurization (BDS), oxidative desulfurization (ODS), and adsorptive desulfurization. In HDS process, sulfur compounds in diesel are removed as hydrogen sulfide. This method utilizes hydrogen over a catalyst and applies high temperature up to 380° C. and high pressure between 500 to 700 psi. Aliphatic sulfides, thiols, thiophenes, and benzothiophenes (BTs) are easily removed because the sulfur atom in their molecular structure can access the active sites of the catalyst. Larger sulfur compounds such as dibenzothiophene (DBT) and alkyl-DBTs, particularly those with the alkyl groups at 4- and 6-positions, are much harder to remove in traditional HDS. These refractory sulfur compounds in diesel have difficulty in reaching the catalyst surface due to the steric hindrance caused by the carbon atoms bound to sulfur. Although improved deep HDS methods can overcome the problem to produce ultra low sulfur fuel, they require higher temperature, higher pressure, and more hydrogen and catalyst consumption, resulting in higher capital and operational costs. Additionally, the diesel treated by deep HDS has decreased lubricity that causes increased wear in a diesel engine.

Biodesulfurization (BDS) uses enzymes to remove the refractory sulfur compounds such as DBT and its derivatives under mild operating conditions through a pathway comprising two monooxygenases, which sequentially oxidize DBT to DBT sulfone and 2-hydroxybiphenyl-29-sulfinic acid, and a desulfinase, which converts 2-hydroxybiphenyl-29-sulfinic acid to the desulfurized end product 2-hydroxybiphenyl. In BDS, incomplete conversion of sulfur compounds occurs, resulting in the original substrate DBT and oxidized sulfur compounds (DBT sulfone and 2-hydroxybiphenyl-29-sulfinic acid) remaining in the fuel. The costs and stability of the biocatalysts in BDS are another obstacle for BDS to achieve commercial viability.

The oxidative desulfurization (ODS) method is another alternative for deep desulfurization of diesel to lower the temperature and pressure conditions and reduce the cost of operation. In this method, sulfur compounds in diesel, which are slightly more polar than their analogous hydrocarbons, are selectively oxidized to form their sulfoxides/sulfones that are highly polar in the presence of an oxidizing agent, most commonly $H_2O_2$, and a transition metal catalyst such as $H_3PM_{12}O_{40}$ [M=Mo(VI), W(VI)]. The sulfoxides/sulfones can be subsequently extracted and removed by acetonitrile. However, extended reaction times to reach high yields, reaction safety due to high concentrations of $H_2O_2$, and its excessive decomposition are major impediments for commercializing this method.

Adsorptive desulfurization using solid adsorbents at lower temperature and pressure, relative to hydrodesulfurization, has been developed recently. ConocoPhillips Company introduced S-Zorb SRT for sulfur removal of diesel that uses a sorbent for attacking sulfur compounds. The sulfur atom remains in the sorbent but the hydrocarbon portion of the molecule is released. A stream of hydrogen in the process prevents a buildup of coke. Another adsorption process called (PSU-SARS) was developed at Pennsylvania State University through selective adsorption at low temperature and ambient pressure without hydrogen consumption. Low sulfur results have been achieved for different liquid fuels in this process by using a composite metal catalyst on a porous substrate. This method will also not adsorb the coexisting aromatic compounds like benzene and naphthalene.

Omid Etemadi investigated and proposed a desulfurization technique combining selective oxidation with adsorption using amorphous activated acidic alumina having a micrometer particle size or epoxy functionalized single wall carbon nanotubes (O-SWNT) to remove from oxidation-treated diesel benthiophene sulfone ($BTO_2$) and dibenzothiophene sulfone ($DBTO_2$), the oxidized products of BT and DBT, respectively (Etemadi, O., Selective adsorption in ultrasound assisted oxidative desulfurization process with nano-engineered adsorbents: Mechanism and Characterization (2007), incorporated herein by reference in its entirety).

In order to meet increasingly rigorous emission control standards being imposed on fossil fuel products, effective, easy to use, and low cost desulfurization techniques, particularly for removing the refractory sulfur compounds from diesel, need to be developed to produce very low sulfur-containing or sulfur-free fuels.

In view of the forgoing, the present disclosure relates to methods for removing sulfur compounds from a hydrocarbon fluid or fuel. More specifically, the present disclosure relates to methods of removing sulfur compounds from a hydrocarbon fluid or fuel using an adsorbent comprising a carbonaceous material doped with nanoparticles of uranyl oxide ($UO_3$).

BRIEF SUMMARY OF THE INVENTION

According to a first aspect, the present disclosure provides a method of removing sulfur compounds from a hydrocarbon fluid. The method includes contacting the hydrocarbon fluid with an adsorbent comprising at least one carbonaceous material selected from the group consisting of activated carbon and carbon nanotubes doped with nanoparticles of uranyl oxide ($UO_3$). The contacting forms a treated hydrocarbon fluid having a lower concentration of the sulfur compounds relative to the hydrocarbon fluid. The adsorbent has a weight ratio of C to U in the range from 9:1 to 17:1, and a weight ratio of C to O in the range from 5:1 to 13:1.

In one or more embodiments, the carbonaceous material is carbon nanotubes doped with nanoparticles of uranyl oxide ($UO_3$), and the carbon nanotubes are multi-walled carbon nanotubes. In some embodiments, the adsorbent comprises multi-walled carbon nanotubes doped with nanoparticles of uranyl oxide, and the multi-walled carbon nanotubes doped with the nanoparticles of uranyl oxide have a BET surface area of greater than about 200 $m^2/g$.

In one or more embodiments, the carbonaceous material is doped with the nanoparticles of uranyl oxide by incipient wetness impregnation.

In one or more embodiments, the hydrocarbon fluid comprises at least one selected from the group consisting of n-hexane, diesel, jet fuel, marine gas oil, and used motor oil, and the sulfur compounds are at least one selected from the group consisting of benzothiophene (BT), alkyl-benzothiophene (alkyl-BT), dibenzothiophene (DBT), alkyl-dibenzothiophene (alkyl-DBT), and thiophene and derivatives thereof. In some embodiments, the adsorbent comprises activated carbon doped with nanoparticles of uranyl oxide, the hydrocarbon fluid is n-hexane, the sulfur compounds are dibenzothiophene (DBT), and the adsorbent removes at least about 95% of the DBT from the n-hexane. In other embodiments, the adsorbent comprises carbon nanotubes doped with nanoparticles of uranyl oxide, the hydrocarbon fluid is n-hexane, the sulfur compounds are dibenzothiophene (DBT), and the adsorbent removes at least about 75% of the DBT from the n-hexane.

In one or more embodiments, the concentration of the adsorbent contacting the hydrocarbon fluid ranges from about 8 g/L to 20 g/L of the hydrocarbon fluid.

In one or more embodiments, the adsorbent is disposed in a fixed bed reactor or fluidized bed reactor and the contacting involves passing the hydrocarbon fluid through the fixed bed reactor or fluidized bed reactor. In some embodiments, the fixed bed reactor comprises a cartridge. In some embodiments, the cartridge further comprises at least one adsorbent selected from the group consisting of a zeolite, activated alumina, and activated carbon.

In one or more embodiments, the adsorbent has a form selected from the group consisting of a granule, a pellet, a sphere, a powder, a woven fabric, a non-woven fabric, a mat, a felt, a block, and a honeycomb.

In one or more embodiments, the carbon nanotubes have an outer diameter ranging from about 10 nm to 20 nm.

In one or more embodiments, the nanoparticles of uranyl oxide have a diameter ranging from about 10 nm to 80 nm.

In one or more embodiments, the adsorbent comprises activated carbon doped with nanoparticles of uranyl oxide, and the activated carbon doped with the nanoparticles of uranyl oxide has a BET surface area of greater than about 900 $m^2/g$.

In one or more embodiments, the adsorbent comprises activated carbon doped with nanoparticles of uranyl oxide, and the activated carbon doped with the nanoparticles of uranyl oxide has a total pore volume of greater than about 0.37 $cm^3/g$.

In one or more embodiments, the method further comprises removing the sulfur compounds from the hydrocarbon fluid by at least one removal method selected from the group consisting of hydrodesulfurization, biodesulfurization, oxidative desulfurization, and adsorptive desulfurization using at least one other adsorbent.

In one or more embodiments, the hydrocarbon fluid is contacted with the adsorbent at a temperature of about 10-40° C. and a pressure of about 1-50 bar.

In one or more embodiments, the method further comprises removing the adsorbent from the treated hydrocarbon fluid.

According to a second aspect, the present disclosure provides a method of removing sulfur compounds from a hydrocarbon fluid. The method includes (a) supplying the hydrocarbon fluid to a hydrotreating unit comprising a catalyst bed and a hydrogen gas source. The catalyst bed comprises a desulfurization catalyst. Contacting the hydrocarbon fluid with the desulfurization catalyst produces a partially desulfurized hydrocarbon fluid stream, (b) removing gaseous products from the partially desulfurized hydrocarbon fluid stream to produce a gas-free partially desulfurized hydrocarbon fluid stream, (c) then supplying the gas-free partially desulfurized hydrocarbon fluid stream after removing the gaseous products to at least one adsorption unit comprising an adsorbent for the removal of the sulfur compounds. The adsorbent comprises at least one carbonaceous material selected from the group consisting of activated carbon and carbon nanotubes doped with nanoparticles of uranyl oxide ($UO_3$), and has a weight ratio of C to U in the range from 9:1 to 17:1, and a weight ratio of C to O in the range from 5:1 to 13:1, and (d) contacting the adsorbent with the gas-free partially desulfurized hydrocarbon fluid stream to substantially remove the sulfur compounds therefrom to produce a desulfurized hydrocarbon fluid stream.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
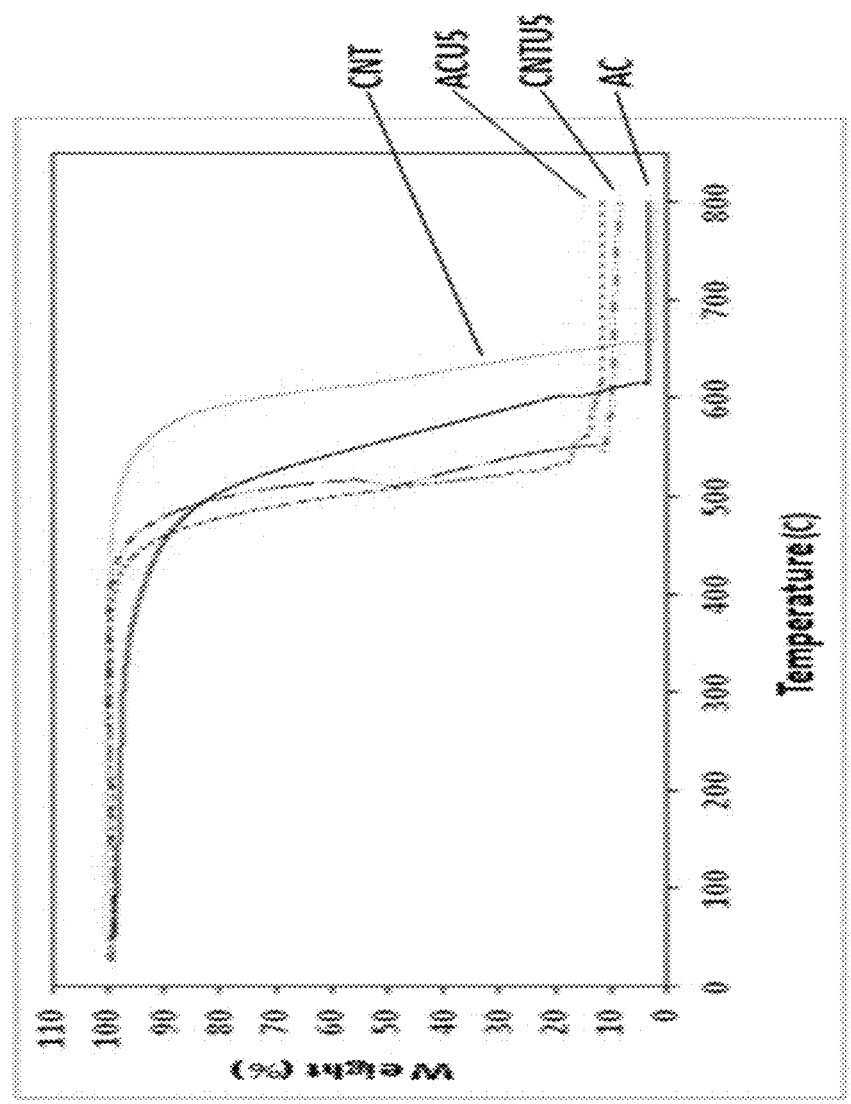
FIG. 1 is a graphical presentation of the thermal gravimetric analysis (TGA) performed with the raw AC and CNT, and the $UO_3$ impregnated AC and CNT (i.e. ACU5 and CNTU5) under air atmosphere according to Example 3.

The present disclosure provides methods of removing sulfur compounds from a hydrocarbon fluid.

According to a first aspect of the disclosure, the method of removing sulfur compounds from a hydrocarbon fluid includes contacting the hydrocarbon fluid with an adsorbent comprising at least one carbonaceous material selected from the group consisting of activated carbon and carbon nanotubes doped with nanoparticles of uranyl oxide ($UO_3$). The contacting forms a treated hydrocarbon fluid having a lower concentration of the sulfur compounds relative to the hydrocarbon fluid. The adsorbent has a weight ratio of C to U in the range from 9:1 to 17:1, and a weight ratio of C to O in the range from 5:1 to 13:1.

In one embodiment, the hydrocarbon fluid is a hydrocarbon liquid. In another embodiment, the hydrocarbon fluid is a hydrocarbon gas. In still another embodiment, the hydrocarbon fluid is a mixture of at least one hydrocarbon liquid and at least one hydrocarbon gas.

In one embodiment, the hydrocarbon fluid comprises n-hexane, which is a model diesel. In another embodiment, the hydrocarbon fluid comprises a (real) diesel fuel. In another embodiment, the hydrocarbon fluid comprises a jet fuel. In another embodiment, the hydrocarbon fluid comprises a marine gas oil. In still another embodiment, the hydrocarbon fluid comprises a used motor oil. In yet another embodiment, the hydrocarbon fluid may comprise any mixture of n-hexane, diesel, jet fuel, marine gas oil, paraffinic materials, mineral oil-derived hydrocarbons, and/or used motor oil.

Non-limiting examples of the sulfur compounds that can be removed by the adsorbents of the present disclosure include alkyl-DBT (e.g. 4,6-dimethyl-DBT, 4-methyl-DBT), DBT, alkyl-BT (e.g. 2-methyl-BT), BT, and thiophene and derivatives thereof.

In one embodiment, the carbonaceous material comprises activated carbon, preferably highly porous activated carbon. In some embodiments, the activated carbon has a BET surface area of at least 400 $m^2/g$ and/or a total pore volume of at least 0.2 $cm^3/g$. In other embodiments, the activated carbon has a BET surface area of at least 600 $m^2/g$ and/or a total pore volume of at least 0.3 $cm^3/g$. In other embodiments, the activated carbon has a BET surface area of at least 800 $m^2/g$ and/or a total pore volume of at least 0.4 $cm^3/g$. In other embodiments, the activated carbon has a BET surface area of at least 1000 $m^2/g$ and/or a total pore volume of at least 0.5 $cm^3/g$. In other embodiments, the activated carbon has a BET surface area of at least 1200 $m^2/g$ and/or a total pore volume of at least 0.6 $cm^3/g$. In still other embodiments, the activated carbon has a BET surface area of at least 1600 $m^2/g$ and/or a total pore volume of at least 0.7 $cm^3/g$.

In another embodiment, the carbonaceous material comprises carbon nanotubes, which may be single-walled carbon nanotubes and/or multi-walled carbon nanotubes. In some embodiments, the carbon nanotubes have an outer diameter of about 5-100 nm, preferably about 5-90 nm, preferably about 10-70 nm, preferably about 10-50 nm, preferably about 10-30 nm, or more preferably about 10-20 nm. In some embodiments, the BET surface area of the carbon nanotubes is at least 200 $m^2/g$. In other embodiments, the BET surface area of the carbon nanotubes is at least 400 $m^2/g$. In other embodiments, the BET surface area of the carbon nanotubes is at least 600 $m^2/g$.

In another embodiment, the carbonaceous material comprises multi-walled carbon nanotubes. In some embodiments, the multi-walled carbon nanotubes may have a structure conforming to the Russian Doll model, i.e. they contain sheets of graphite arranged in concentric cylinders. In other embodiments, the multi-walled carbon nanotubes have a structure conforming to the Parchment model, i.e. they contain a single sheet of graphite rolled in around themselves and resemble a scroll of parchment.

Uranium is a silvery white, weakly radioactive metal. In nature, uranium is found as uranium-238 (99.2739-99.2752%), uranium-235 (0.7198-0.7202%), and a very small amount of uranium-234 (0.0050-0.0059%). When finely divided and exposed to air, uranium metal becomes coated with a dark layer of uranium oxide. There are various forms of uranium oxide corresponding to different oxidation states of uranium. Exemplary uranium oxides include uranium dioxide ($UO_2$), uranium trioxide or uranyl oxide ($UO_3$), uranium monoxide (UO), diuranium pentoxide ($U_2O_5$), triuranium octoxide ($U_3O_8$), and uranium peroxide ($UO_4.2H_2O$). The most common forms of uranium oxide are triuranium octoxide ($U_3O_8$) and $UO_2$, both of which are solids that have a low solubility in water and are relatively stable over a wide range of environmental conditions. Triuranium octoxide is (depending on conditions) the most stable compound of uranium and is the form most commonly found in nature.

In some embodiments, the nanoparticles of uranyl oxide with which the carbonaceous material is doped have substantially spherical shapes with a diameter of about 1-200 nm, about 1-180 nm, about 5-150 nm, about 5-100 nm, about 10-80 nm, about 15-60 nm, or about 20-40 nm.

In one embodiment, the nanoparticles of uranyl oxide form a layer covering the surface of the doped activated carbon sheets. In another embodiment, the nanoparticles of uranyl oxide form a layer covering an exterior surface and/or an interior surface of the doped carbon nanotube. In still another embodiment, the nanoparticles of uranyl oxide are sandwiched between sheets of the doped activated carbon or surfaces of the doped carbon nanotube(s).

The coverage of the surfaces of the doped carbonaceous materials by the nanoparticles of uranyl oxide can vary. A preferred coverage provides the maximum surface area of uranyl oxide per unit mass of the uranyl oxide used. In some embodiments, the coverage of the surfaces of the doped activated carbon sheets or the doped carbon nanotubes is about 5-90%, preferably about 10-80%, preferably about 20-60%, or preferably about 30-50%.

In some embodiments, the adsorbent comprises activated carbon and/or carbon nanotubes doped with nanoparticles of both uranyl oxide and aluminum oxide. The aluminum content is preferably 5-10% of the total weight of the doped carbonaceous material, as disclosed in a related U.S. patent application Ser. No. 14/836,560, incorporated herein by reference in its entirety.

In some embodiments, the adsorbent has a weight ratio of C to U in the range from about 9:1 to 17:1, from about 10:1 to 14:1, from about 11:1 to about 13:1, or from about 11:1 to about 12:1. In some embodiments, the adsorbent has a weight ratio of C to O in the range from about 5:1 to 13:1, from about 5:1 to 11:1, from about 6:1 to 10:1, from about 6:1 to 9:1, or from about 7:1 to 8:1. In some embodiments, the uranium content of the adsorbent ranges from about 2% to about 10%, preferably from about 3% to about 8%, or more preferably from about 5% to about 7% of the total weight of the adsorbent, and the carbon content of the adsorbent ranges from about 55% to about 90%, or from about 60% to about 90%, or from 75% to about 88% of the total weight of the adsorbent.

In one embodiment, the carbonaceous material is doped with the nanoparticles of uranyl oxide by incipient wetness impregnation. In incipient wetness impregnation, the carbonaceous material is mixed with a solution of at least one uranium and/or uranyl salt, non-limiting examples of which include uranium peroxide dihydrate ($UO_4.2H_2O$), ammonium diuranate ($(NH4)_2U_2O_7$), sodium diuranate ($Na_2U_2O_7$), uranyl nitrate hexahydrate ($UO_2(NO_3)_2.6H_2O$), uranyl acetate, uranyl oxalate, hydrogen uranyl phosphate, and uranyl sulfate. The resulting mixture is preferably ultrasonicated to obtain a homogeneous distribution of the uranium and/or uranyl salt(s) on the surface of the carbonaceous material. The impregnated salt may then be converted to uranyl oxide by calcination or a similar thermal treatment. In some embodiments, the temperature of the calcination or the similar thermal treatment ranges from about 100° C. to 700° C., from about 100° C. to 300° C., or from about 350° C. to 600° C. In other embodiments, the solution of the at least one uranium and/or uranyl salt may contain an ionic liquid, as disclosed in U.S. Pat. No. 8,747,786 B2, incorporated herein by reference in its entirety.

In some embodiments, the adsorbent comprises activated carbon doped with nanoparticles of uranyl oxide, the hydrocarbon fluid is n-hexane, and the sulfur compounds are dibenzothiophene (DBT). The adsorbent removes at least about 50%, at least about 60%, at least about 70%, at least about 80%, at least about 90%, or at least about 95%, of the DBT from the n-hexane.

In some embodiments, the adsorbent comprises carbon nanotubes doped with nanoparticles of uranyl oxide, the hydrocarbon fluid is n-hexane, and the sulfur compounds are dibenzothiophene (DBT). The adsorbent removes at least about 40%, at least about 60%, at least about 75%, of the DBT from the n-hexane.

The concentrations of the adsorbents used to remove the sulfur compounds from the hydrocarbon fluid can vary, depending on the initial concentration of the sulfur compounds in the hydrocarbon fluid, which may range from about 100 ppmw, for example, in a jet fuel, to about 4000 ppmw, for example, in a military diesel fuel, the removal efficiency required, the availability of the adsorbents, the capacity for the treatment of the hydrocarbon fluid with the adsorbents, e.g. the size of a vessel used for batch adsorption, and the capacity for filtration of the adsorbents from the hydrocarbon fluid, etc. A typical concentration of the adsorbents treating the hydrocarbon fluid ranges from about 1 g/L to 34 g/L, from 3 g/L to 30 g/L, from 6 g/L to 24 g/L, from 8 g/L to 20 g/L, from 12 g/L to 16 g/L, of the hydrocarbon fluid.

Besides batch adsorption, granular particles of the adsorbents may be installed in a fixed bed reactor or fluidized bed reactor. For example, the hydrocarbon fluid containing the sulfur compounds can be applied to a fixed bed column of the uranyl oxide nanoparticle doped activated carbon or carbon nanotubes, or a combination of the two, and the effluent of the column comprises the treated hydrocarbon fluid with reduced concentrations of the sulfur compounds. In some embodiments, the fixed bed reactor of the adsorbents comprises a cartridge for easy carry and use. For example, such a cartridge can be attached to the nozzle of a hydrocarbon fluid (fuel) pump and the hydrocarbon fluid (fuel) intake system of a device, e.g. a gasoline or diesel engine. Further, the cartridge can include other sulfur compound adsorbents such as a zeolite, activated alumina, and activated carbon.

Alternatively, one or more of the adsorbents can form a fluidized bed reactor with the hydrocarbon fluid containing the sulfur compounds, for example, by introducing the pressurized hydrocarbon fluid through the particulate medium of the adsorbents. In the fluidized bed reactor, contact between the adsorbents and the hydrocarbon fluid is greatly enhanced as compared to a fixed bed column or reactor, leading to a higher removal efficiency of the sulfur compounds from the hydrocarbon fluid.

Additionally, the adsorbents can take a variety of forms to facilitate removal of the sulfur compounds from the hydrocarbon fluid. Non-limiting examples of the forms include a granule, a pellet, a sphere, a powder, a woven fabric, a non-woven fabric, a mat, a felt, a block, and a honeycomb. In some embodiments, the method further comprises removing the adsorbent from the treated hydrocarbon fluid. For example, the adsorbent(s) in powder form may be injected into a hydrocarbon fluid storage tank and then removed by filtration or settling. The adsorbents in fiber form may be inserted in a section of the hydrocarbon fluid supply piping, and optionally be removed when their adsorption capacity has been exhausted and replaced by fresh adsorbents.

In one embodiment, the adsorbent may comprise one of the carbonaceous materials, either activated carbon or carbon nanotubes, doped with nanoparticles of uranyl oxide ($UO_3$). In another embodiment, the adsorbent may comprise a mixture of activated carbon doped with nanoparticles of uranyl oxide and carbon nanotubes doped with nanoparticles of uranyl oxide. The mass ratio of the activated carbon doped with nanoparticles of uranyl oxide to the carbon nanotubes doped with nanoparticles of uranyl oxide in the mixture may vary without limitation, depending on the availability and cost considerations of the two types of the uranyl oxide doped carbonaceous materials, the total volume of the mixed uranyl oxide doped carbonaceous materials preferred, for example, to form a fixed bed reactor or cartridge or to conveniently remove the mixed adsorbents from the treated hydrocarbon fluid after, for example, a batch adsorption, the weight of the mixed adsorbents desired, etc. In a preferred embodiment, the mass ratio of the activated carbon doped with nanoparticles of uranyl oxide to the carbon nanotubes doped with nanoparticles of uranyl oxide in the mixture is at least 1:1, more preferably from 1:1 to 10:1, since the activated carbon doped with nanoparticles of uranyl oxide has a higher capacity to adsorb DBT and thiophene than the carbon nanotubes doped with nanoparticles of uranyl oxide. Additionally, in the mixed uranyl oxide doped carbonaceous materials, the activated carbon doped with nanoparticles of uranyl oxide may form a separate layer or section from the carbon nanotubes doped with nanoparticles of uranyl oxide, for example, in a fixed bed reactor, or the two uranyl oxide doped carbonaceous materials may freely mingle with each other, for example, in a fixed bed reactor, in a batch adsorption vessel, or in a fluidized bed reactor.

In one embodiment, the method of using the adsorbent to remove the sulfur compounds from the hydrocarbon fluid may take a form of continuous and/or multi-stage adsorption with the adsorbent(s). For example, multiple fixed bed columns or reactors of the adsorbent(s) or, more broadly, multiple adsorption units of any suitable modes or configurations and their combinations, e.g. batch adsorption, cartridge, fluidized bed reactor, etc., can be set up to remove the sulfur compounds from the hydrocarbon fluid in a parallel and/or sequential manner. In some embodiments, the adsorption columns, reactors, or units set up in the parallel fashion may be standby columns, reactors, or units ready to replace another set of parallel columns, reactors, or units whose adsorption capacity has been exhausted to make the removal operation continuous. In other embodiments, the adsorption columns, reactors, or units set up in the sequential or serial fashion allow the sulfur compounds to be removed from the hydrocarbon fluid through multiple stages to achieve a high removal efficiency.

In some embodiments, the hydrocarbon fluid is contacted with the adsorbent at a temperature of about 0-100° C., preferably about 10-80° C., preferably about 10-60° C., preferably about 10-40° C., or preferably about 20-30° C.

In some embodiments, the hydrocarbon fluid is contacted with the adsorbent at a pressure of about 1-100 bar, about 1-80 bar, preferably about 1-50 bar, preferably about 1-30 bar, preferably about 1-20 bar, or preferably about 1-10 bar.

In some embodiments, the adsorbent comprises activated carbon doped with nanoparticles of uranyl oxide, and the activated carbon doped with the nanoparticles of uranyl oxide has a BET surface area of greater than about 500 $m^2/g$, greater than about 700 $m^2/g$, greater than about 900 $m^2/g$, greater than about 1100 $m^2/g$, greater than about 1300 $m^2/g$, greater than about 1500 $m^2/g$, or greater than about 1700 $m^2/g$.

In some embodiments, the adsorbent comprises activated carbon doped with nanoparticles of uranyl oxide, and the activated carbon doped with the nanoparticles of uranyl oxide has a total pore volume of greater than about 0.20 $cm^3/g$, greater than about 0.37 $cm^3/g$, greater than about 0.60 $cm^3/g$, or greater than about 0.80 $cm^3/g$.

In some embodiments, the adsorbent comprises multi-walled carbon nanotubes doped with nanoparticles of uranyl oxide, and the multi-walled carbon nanotubes doped with the nanoparticles of uranyl oxide have a BET surface area of greater than about 100 $m^2/g$, greater than about 150 $m^2/g$, greater than about 200 $m^2/g$, greater than about 250 $m^2/g$, greater than about 300 $m^2/g$, or greater than about 400 $m^2/g$.

In some embodiments, the method of removing the sulfur compounds from the hydrocarbon fluid further comprises removing the sulfur compounds from the hydrocarbon fluid by at least one removal method selected from the group consisting of hydrodesulfurization, biodesulfurization, oxidative desulfurization, and adsorptive desulfurization using at least one other adsorbent. For example, the method may further comprise ultrasonic assisted oxidative desulfurization (UAOD) (to oxidize DBT to $DBTO_2$) followed by adsorption with activated acidic alumina (to selectively remove $DBTO_2$). In one embodiment, the DBT that is not oxidized to $DBTO_2$ can be removed by the adsorbent(s) of the present disclosure to obtain the treated hydrocarbon fluid with a low sulfur content, for example, of less than 15 ppmw, or more preferably less than 10 ppmw. This embodiment of the method is advantageous, because in UAOD processes the oxidation reactivity of the sulfur compounds in the hydrocarbon fluid is in a decreasing order of 4,6-dimethyl-DBT>4-methyl-DBT>DBT>2-methyl-BT>BT. Removing non-oxidized DBT by the adsorbents of the present disclosure following one round of UAOD-acidic alumina adsorption process may obviate the need for, or reduce the number of, consecutive rounds of UAOD-acidic alumina adsorption process to obtain the low sulfur hydrocarbon fluid. In an alternative embodiment, the hydrocarbon fluid can first be treated with the adsorbents of the present disclosure to reduce the concentration of the DBT that is subsequently oxidized to $DBTO_2$ by the UAOD processes. The $DBTO_2$ can then be preferentially adsorbed and removed by the activated acidic alumina, likewise resulting in the treated hydrocarbon fluid with a low sulfur content.

According to a second aspect of the disclosure, the method of removing sulfur compounds from a hydrocarbon fluid includes (a) supplying the hydrocarbon fluid to a hydrotreating unit comprising a catalyst bed and a hydrogen gas source. The catalyst bed comprises a desulfurization catalyst. Contacting the hydrocarbon fluid with the desulfurization catalyst produces a partially desulfurized hydrocarbon fluid stream, (b) removing gaseous products from the partially desulfurized hydrocarbon fluid stream to produce a gas-free partially desulfurized hydrocarbon fluid stream, (c) then supplying the gas-free partially desulfurized hydrocarbon fluid stream after removing the gaseous products to at least one adsorption unit comprising an adsorbent for the removal of the sulfur compounds. The adsorbent comprises at least one carbonaceous material selected from the group consisting of activated carbon and carbon nanotubes doped with nanoparticles of uranyl oxide ($UO_3$), and has a weight ratio of C to U in the range from 9:1 to 17:1, and a weight ratio of C to O in the range from 5:1 to 13:1, and (d) contacting the adsorbent with the gas-free partially desulfurized hydrocarbon fluid stream to substantially remove the sulfur compounds therefrom to produce a desulfurized hydrocarbon fluid stream.

In some embodiments, the adsorbent in the method of this aspect has the same characteristics as the adsorbent in the method of the first aspect of the disclosure.

In one embodiment, the method is operable to remove sulfur compounds from a hydrocarbon fluid in a commercial or industrial setting.

In some embodiments, the hydrocarbon fluid comprises at least one selected from gasoline, kerosene and diesel.

In one embodiment, the adsorbent comprising uranyl oxide nanoparticle doped activated carbon and/or carbon nanotubes forms at least one adsorption unit, preferably serially connected, and preferably with standby units for continuous removal operation. The adsorption units can be fixed bed type, expanded bed type, or the like. The adsorption temperature is about 0-100° C., preferably about 10-80° C., preferably about 10-60° C., preferably about 10-40° C., or preferably about 20-30° C. The adsorption pressure is about 1-100 bar, about 1-80 bar, preferably about 1-50 bar, preferably about 1-30 bar, preferably about 1-20 bar, or preferably about 1-10 bar.

In one embodiment, a hydrocarbon fluid feed, preferably with a boiling point of 20-800° C., or more preferably 50-700° C., or more preferably 100-650° C., or more preferably 200-500° C., is introduced into a first stage hydrotreating unit via a feed stream. The feed stream may contain from 1-3 wt % sulfur. A portion of the sulfur compounds contained in the feed stream is removed via a hydrodesulfurization reaction by catalyst in the presence of high pressure hydrogen. The sulfur compounds are converted to hydrogen sulfide by this reaction.

With gaseous products and hydrogen removed by a suitable device, the hydrocarbon fluid stream then exits the first stage hydrotreating unit and is introduced into one or more adsorption units, where the hydrocarbon fluid stream contacts the uranyl oxide nanoparticle doped activated carbon and/or carbon nanotubes, and the sulfur compounds are preferably substantially removed from the hydrocarbon fluid stream. The sulfur compounds, such as thiophene, alkylated thiophene, benzothiophene, alkylated benzothiophene, dibenzothiophene, and alkylated dibenzothiophene, remain on the uranyl oxide nanoparticle doped carbonaceous material(s) during the adsorption operation.

The hydrocarbon fluid stream exiting the adsorption unit(s) is preferably delivered to a second stage hydrotreating unit. A reduced sulfur content in the hydrocarbon fluid stream following the first round of hydrotreating and adsorption facilitates the second stage hydrodesulfurization over catalyst because less hydrogen sulfide, which is a strong inhibitor for hydrodesulfurization, is evolved during the second stage hydrotreating. Additionally, removal of refractory sulfur compounds, e.g. DBT and alkyl-DBTs, increases the activity of catalyst, because refractory sulfur compounds are also strong inhibitors for hydrodesulfurization. Additionally, the hydrocarbon fluid stream having lower sulfur content is hydrotreated again to produce a hydrocarbon fluid stream containing an even smaller amount of sulfur. In some embodiments, the hydrocarbon fluid stream exiting the second stage hydrotreating unit preferably contains 0-50 ppmw, preferably 0-30 ppmw, or more preferably 0-10 ppmw of sulfur.

Having generally described this invention, a further understanding can be obtained by reference to certain specific examples which are provided herein for purposes of illustration only and are not intended to be limiting unless otherwise specified.

Example 1

Materials and Apparatus

Activated carbon (AC) was purchased from Cenapro Chemical Corporation (Mandaue City Philippine) and multi-walled carbon nanotubes (CNTs) were purchased from Timesnano company (purity 95%, outer diameter (OD) 10-20 nm, length 10-30 m, and specific surface area (SSA) 200 $m^2/g$). Both were used as received. Ethanol (analytical grade), thiophene (>99%), dibenzothiophene (DBT) (>99%) and n-hexane (anhydrous, HPLC grade, >99%) were purchased from Sigma-Aldrich. Naphthalene (>98%) was purchased from Fluka, and uranyl nitrate hexahydrate $UO_2(NO_3)_2.6H_2O$ (99.9%) was purchased from Researchlab. The oxidation under air and degradation under nitrogen atmosphere of the prepared adsorbents were examined using thermal gravimetric analysis (TGA)/differential scanning calorimetry (DSC) (TA Instrument Q Series Q600 SDT). The surface areas and pore volumes of the adsorbents were measured using surface area analyzer Micrometrics (ASAP 2020 V4.02). The texture and morphology of the adsorbents were examined using Scanning Electron Microscope (SEM) (TESCAN LYRA3) coupled with energy-dispersive X-ray spectroscopy (EDX) (Oxford, detector model X-Max). JOEL-2100F Field Emission Transmittance Electron Microscope (FE-TEM) was used for particle size determination.

Example 2

Preparation of Activated Carbon (AC) and Multi-Walled Carbon Nanotubes (CNTs) Doped with Nanoparticles of Uranyl Oxide ($UO_3$)

AC and CNTs were doped with $UO_3$ by an incipient wetness impregnation method to make the $UO_3$ impregnated carbonaceous materials containing 5% by total weight of uranium (U), designated as ACU5 and CNTU5. To prepare the $UO_3$ impregnated carbonaceous materials, 1.05 g of $UO_2(NO_3)_2.6H_2O$ were weighed accurately and dissolved in 400 mL of 1% deionized water/99% ethanol. 9.5 g of AC or CNTs were added slowly to the $UO_2(NO_3)_2$ solution with stirring. The resulting mixture was ultra-sonicated for 2 hours using a sonicator (UP400S Hielscher-Ultrasound Technology) to obtain a homogeneous distribution of the uranyl salt on the surface of the carbonaceous material. The sonicated mixture was dried in an oven (Precision from Thermo Scientific) at 80° C. for 48 hours. The resulting solid material was ground and calcinated at 350° C. in a furnace for 2 hours to form the $UO_3$ impregnated carbonaceous material, which was stored in a tightly closed vial before being used in the experiments.

Example 3

Characterization of the AC and CNTs Impregnated with the Nanoparticles of Uranyl Oxide ($UO_3$)

1. Thermal Gravimetric Analysis (TGA)/Differential Scanning Calorimetry (DSC)

Thermal oxidation of raw and $UO_3$ impregnated AC and CNTs was investigated by TGA/DSC (TA Instrument Q Series Q600 SDT) performed with 10 mg of each sample at a heating rate of 10° C./min, with the oxidation temperature increasing from room temperature to 800° C., and under atmospheric air with a flow rate of 100 mL/min. As shown in FIG. 1, the residual solvent of each carbonaceous material was evaporated below 100° C. The initial oxidation temperatures of the raw AC and CNTs were approximately 400° C. and 550° C., respectively. The final oxidation temperatures of the raw AC and CNTs were 600° C., and 650° C., respectively. By contrast, the $UO_3$ impregnated AC and CNTs were oxidized completely in air at 520° C. and 550° C., respectively, indicating that the doping with $UO_3$ resulted in an accelerated oxidation of the carbonaceous materials in the air.

Figure 2:
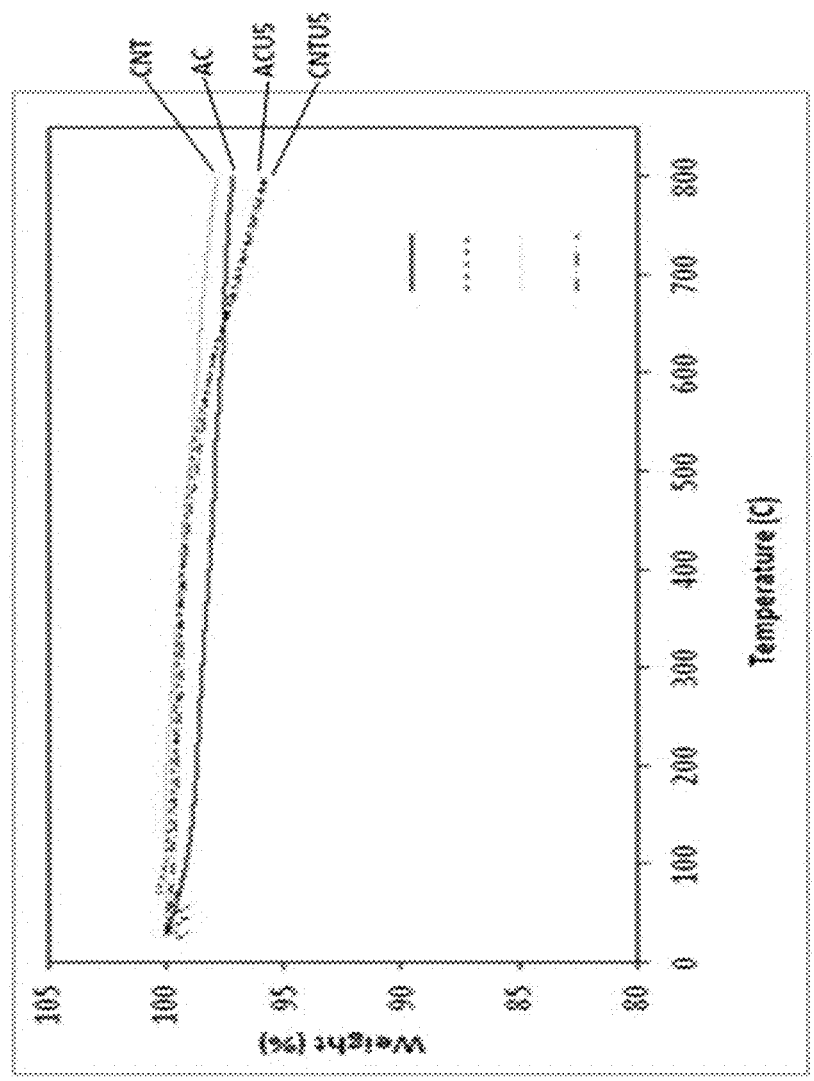
FIG. 2 is a graphical presentation of the thermal gravimetric analysis (TGA) performed with the raw AC and CNT, and the $UO_3$ impregnated AC and CNT (i.e. ACU5 and CNTU5) under nitrogen atmosphere according to Example 3.

A similar experiment was carried out under nitrogen atmosphere to examine the degradation of the raw and $UO_3$ impregnated AC and CNTs. The TGA curves in FIG. 2 show that there was no significant weight loss of the raw AC and CNTs in the temperature range studied. A weight loss of around 2% resulted from the evaporation the residual solvents of the raw AC and CNTs. However, the $UO_3$ impregnated AC and CNTs lost about 5% of the original weight in the temperature range of 500-800° C. due to the reduction of the uranyl oxide ($UO_3$) to uranium dioxide ($UO_2$) in the presence of the carbonaceous materials.

2. Textural and Morphology Examination

Figure 4:
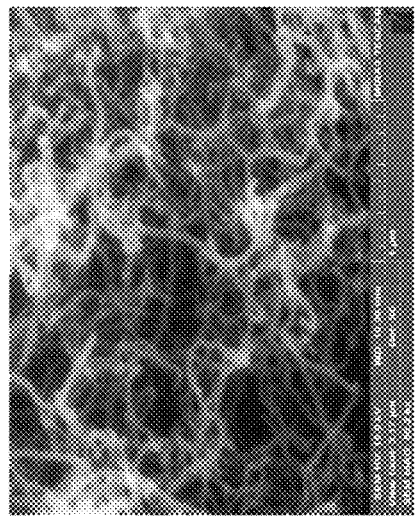
FIG. 4 is a scanning electron microscope (SEM) image of the raw CNTs according to Example 3.
Figure 3:
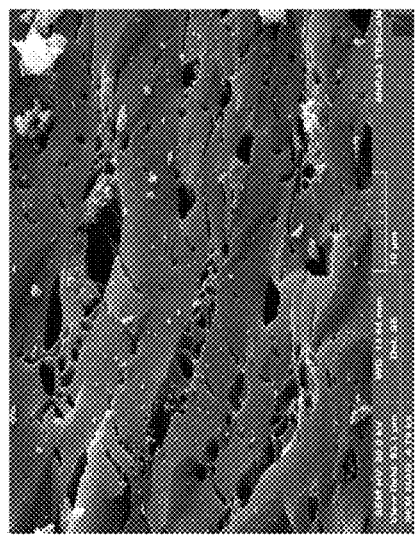
FIG. 3 is a scanning electron microscope (SEM) image of the raw AC according to Example 3.
Figure 6:
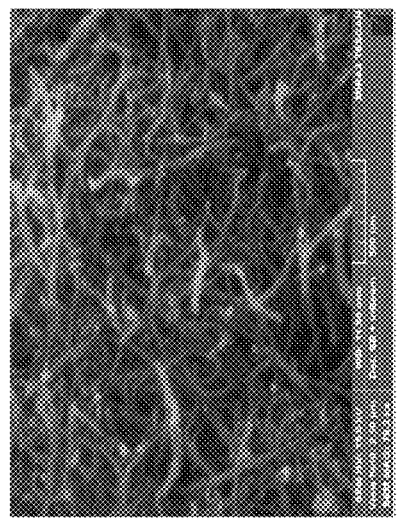
FIG. 6 is a scanning electron microscope (SEM) image of the $UO_3$ impregnated CNTs (CNTU5) according to Example 3.
Figure 5:
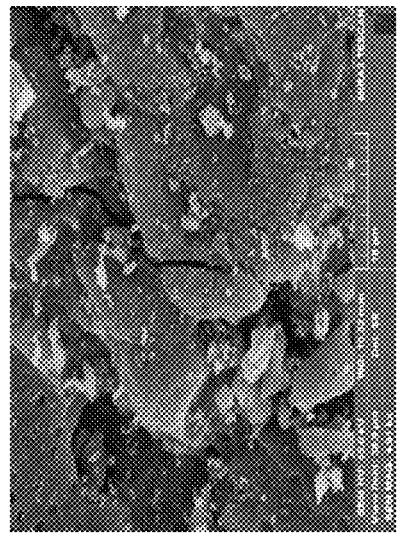
FIG. 5 is a scanning electron microscope (SEM) image of the $UO_3$ impregnated AC (ACU5) according to Example 3.

The morphology of the raw and uranyl oxide impregnated AC and CNTs was characterized using the scanning electron microscope (SEM) and field emission transmittance electron microscope (FE-TEM). The SEM images of the raw AC and CNTs are shown in FIG. 3 and FIG. 4, respectively. Referring to the SEM images of the $UO_3$ impregnated AC and CNTs in FIG. 5 and FIG. 6, respectively, a layer of spherical $UO_3$ particles covered the surface of the AC and the CNTs.

Table 1 shows the elemental compositions of the $UO_3$-impregnated AC and CNTs determined by energy dispersive X-ray analysis (EDX). The actual uranium content was close to the theoretical uranium content of 5% of the total weight of each $UO_3$ impregnated carbonaceous material.

TABLE 1

Weight percentages of carbon, oxygen, and uranium in the UO$_3$ impregnated carbonaceous materials ACU5 and CNTU5

| Adsorbent | Element | Weight % |
|---|---|---|
| ACU5 | C | 87.44 |
|  | O | 7.21 |
|  | U | 5.35 |
| CNTU5 | C | 80.39 |
|  | O | 12.41 |
|  | U | 6.66 |

Figure 8:
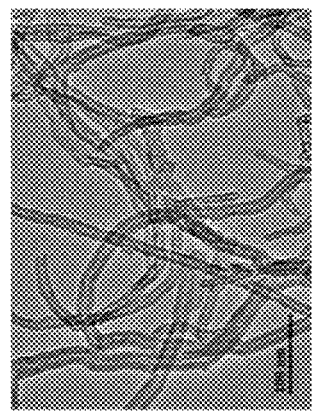
FIG. 8 is a field emission transmittance electron microscope (EF-TEM) image of the raw CNTs at higher magnification (100 nm image scale) according to Example 3.
Figure 7:
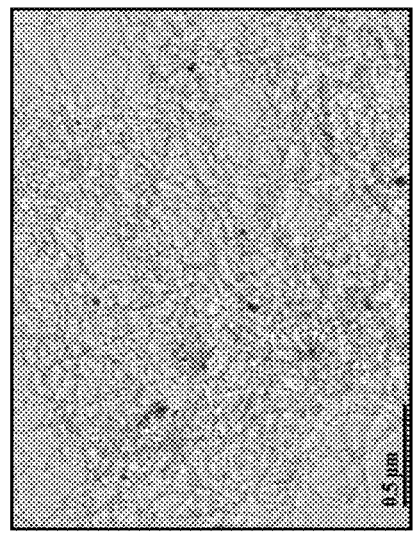
FIG. 7 is a field emission transmittance electron microscope (EF-TEM) image of the raw CNTs according to Example 3.
Figure 10:
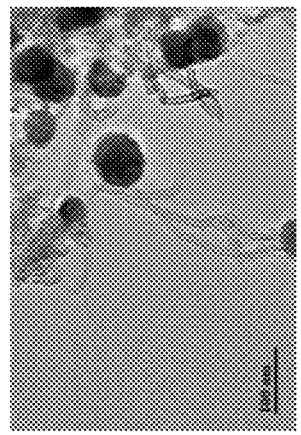
FIG. 10 is a field emission transmittance electron microscope (EF-TEM) image of the $UO_3$ impregnated CNTs (CNTU5) at higher magnification (100 nm image scale) according to Example 3.
Figure 9:
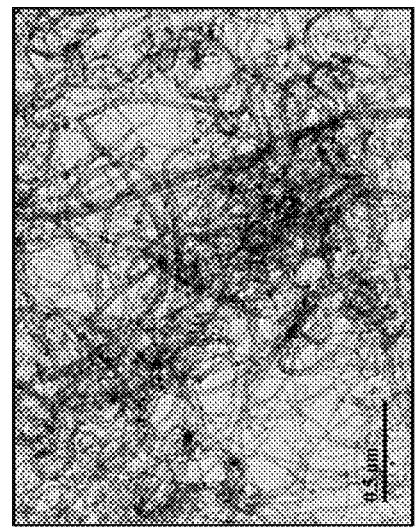
FIG. 9 is a field emission transmittance electron microscope (EF-TEM) image of the $UO_3$ impregnated CNTs (CNTU5) according to Example 3.
Figure 11:
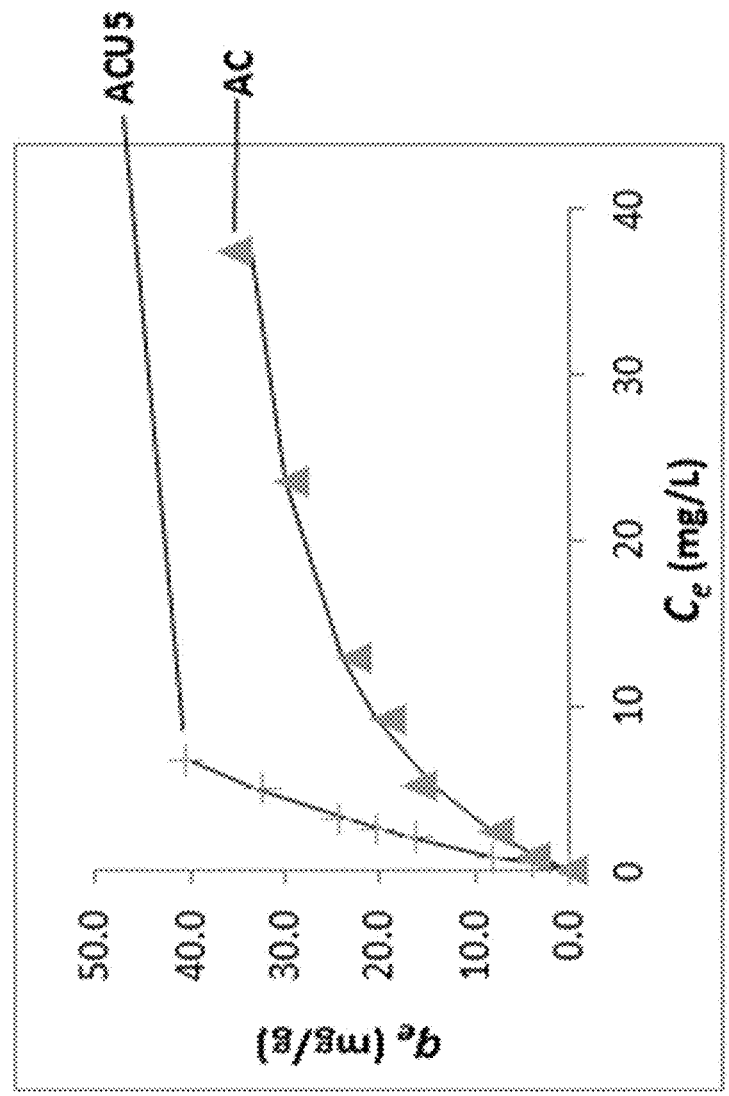
FIG. 11 is a graphical presentation of the adsorption isotherms fitted by the Langmuir model of AC and ACU5 for DBT adsorption. The adsorption time is 120 min, the adsorption temperature is 25° C., and the shaking speed is 200 rpm according to Example 4.
Figure 12:
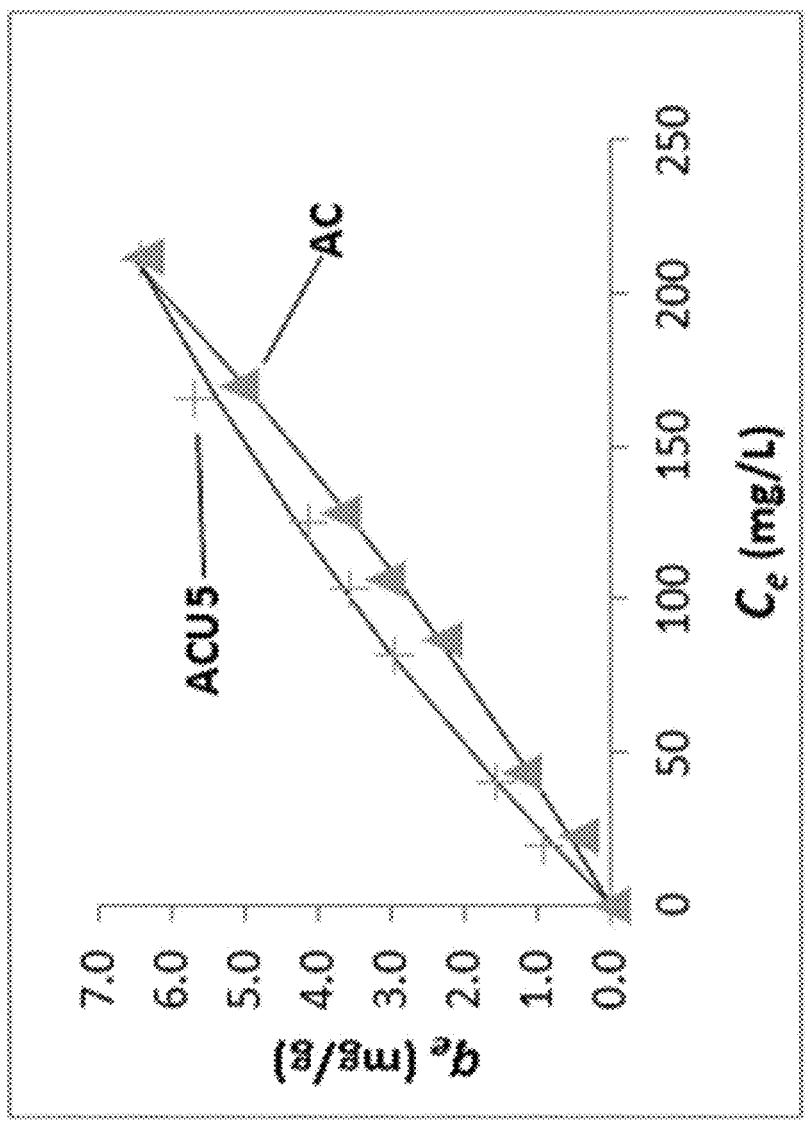
FIG. 12 is a graphical presentation of the adsorption isotherms fitted by the Langmuir model of AC and ACU5 for thiophene adsorption. The adsorption time is 120 min, the adsorption temperature is 25° C., and the shaking speed is 200 rpm according to Example 4.
Figure 13:
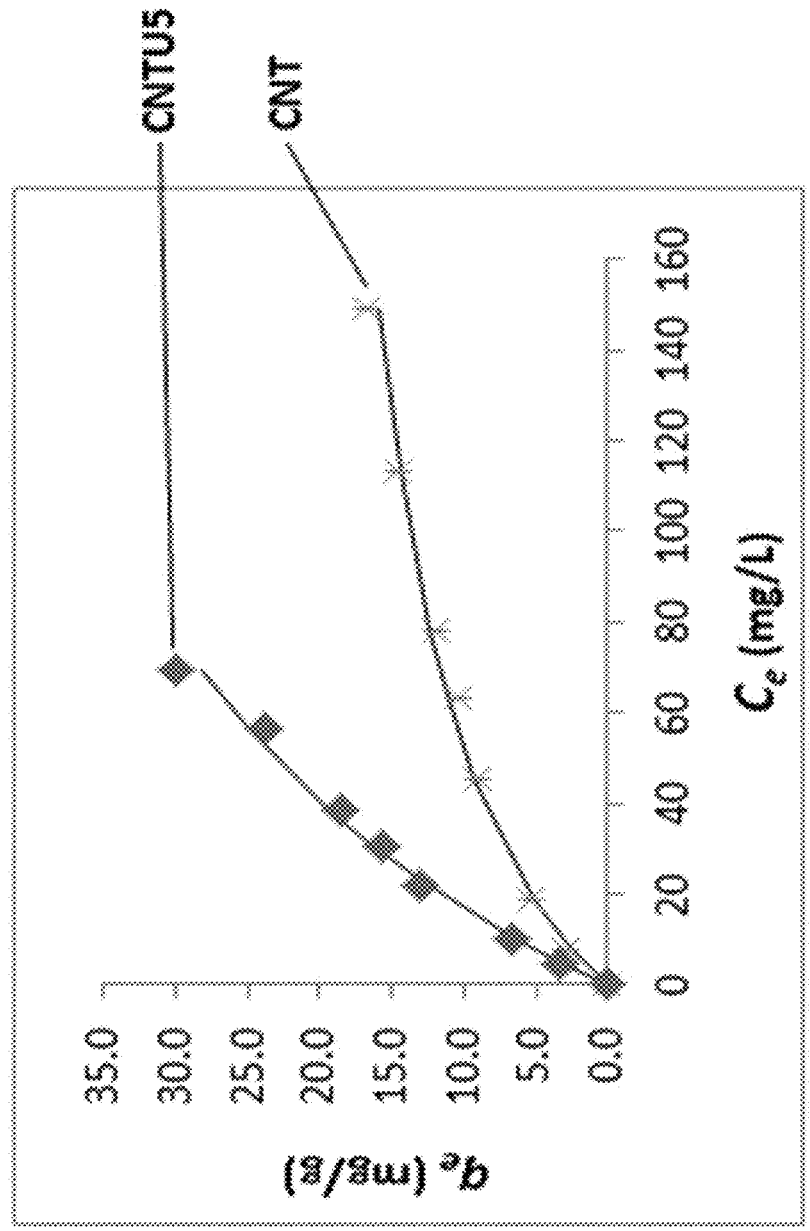
FIG. 13 is a graphical presentation of the adsorption isotherms fitted by the Langmuir model of CNT and CNTU5 for DBT adsorption. The adsorption time is 120 min, the adsorption temperature is 25° C., and the shaking speed is 200 rpm according to Example 4.
Figure 14:
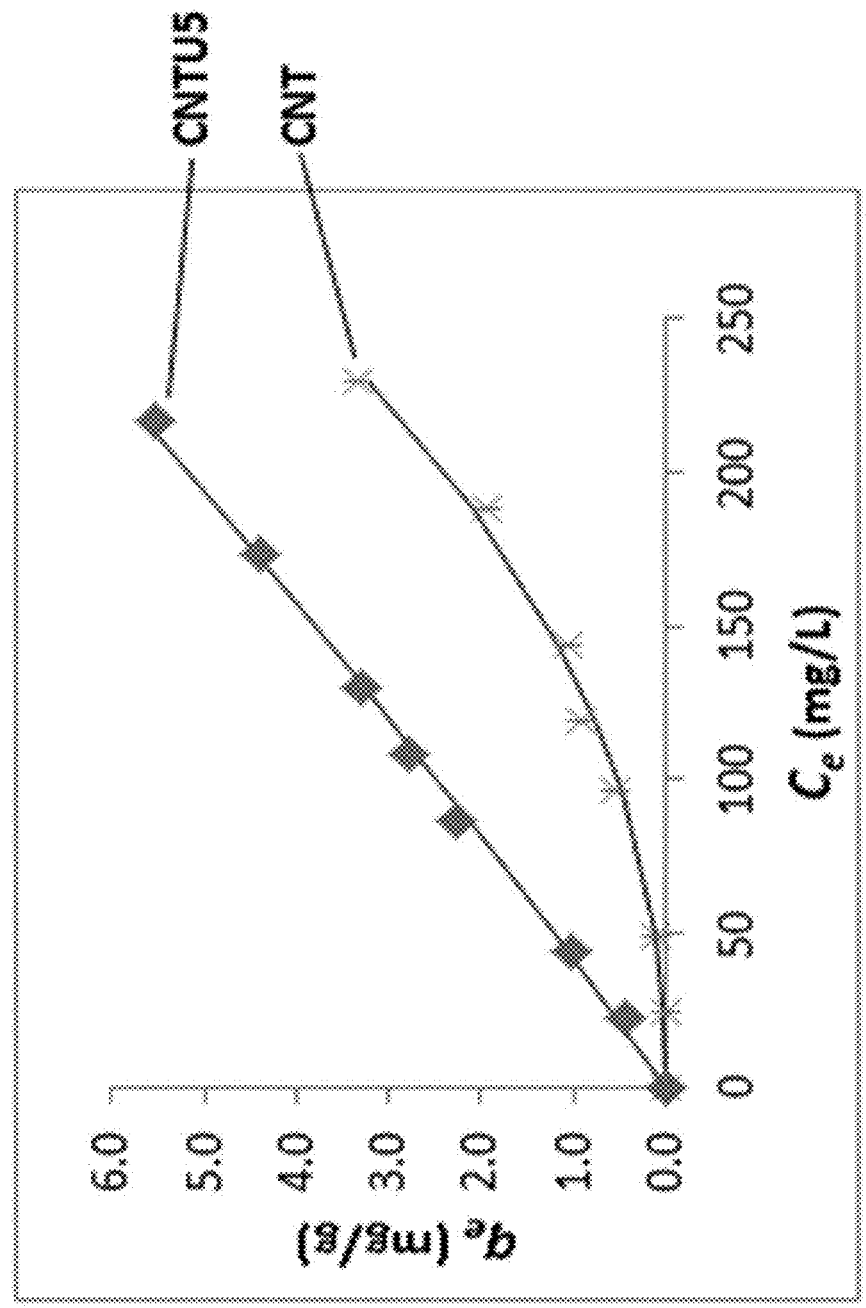
FIG. 14 is a graphical presentation of the adsorption isotherms fitted by the Langmuir model of CNT and CNTU5 for thiophene adsorption. The adsorption time is 120 min, the adsorption temperature is 25° C., and the shaking speed is 200 rpm according to Example 4.
Figure 15:
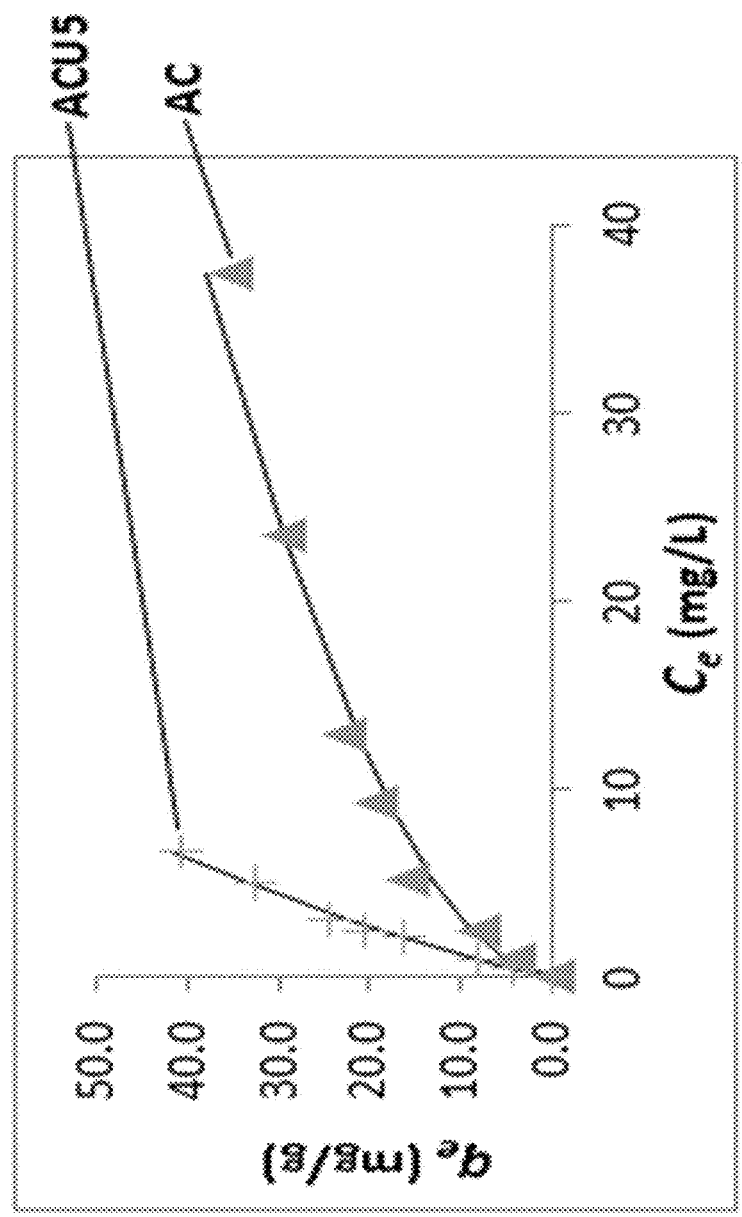
FIG. 15 is a graphical presentation of the adsorption isotherms fitted by the Freundlich model of AC and ACU5 for DBT adsorption. The adsorption time is 120 min, the adsorption temperature is 25° C., and the shaking speed is 200 rpm according to Example 4.
Figure 16:
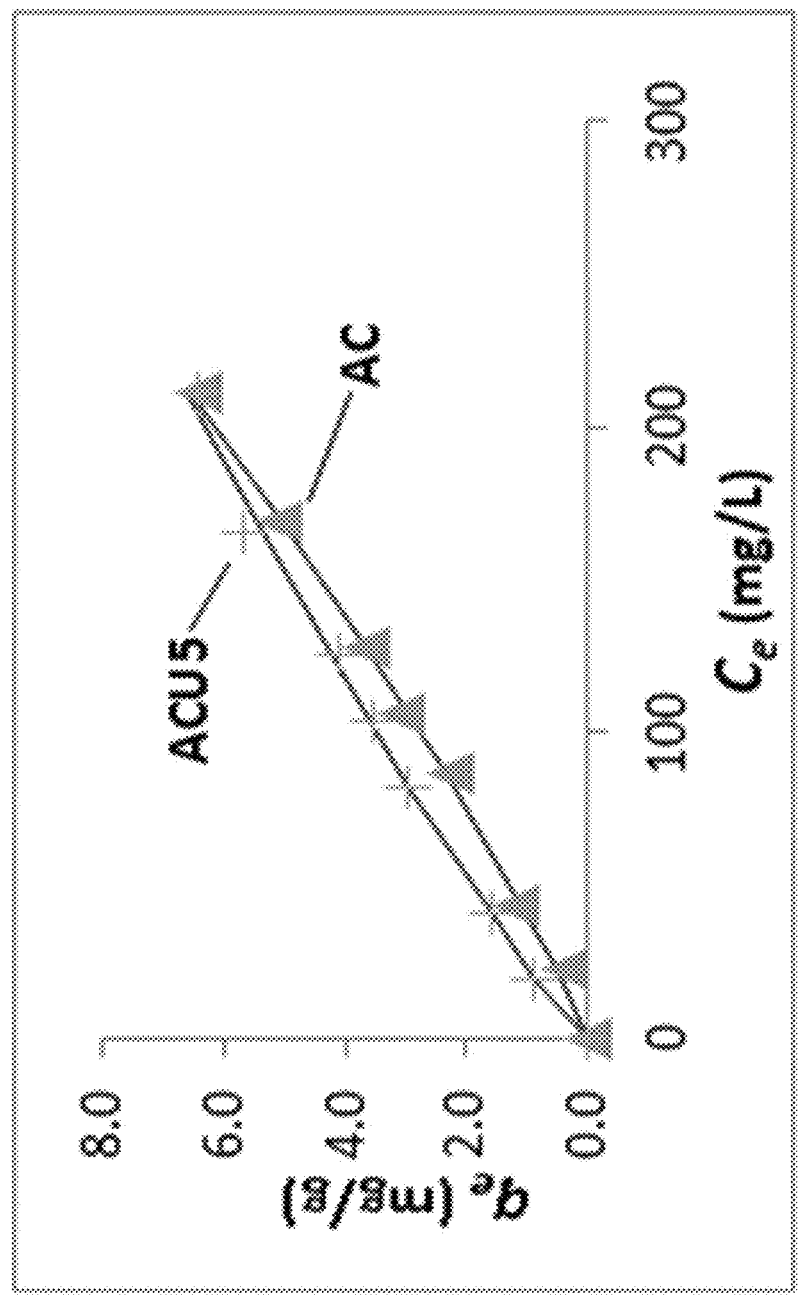
FIG. 16 is a graphical presentation of the adsorption isotherms fitted by the Freundlich model of AC and ACU5 for thiophene adsorption. The adsorption time is 120 min, the adsorption temperature is 25° C., and the shaking speed is 200 rpm according to Example 4.
Figure 17:
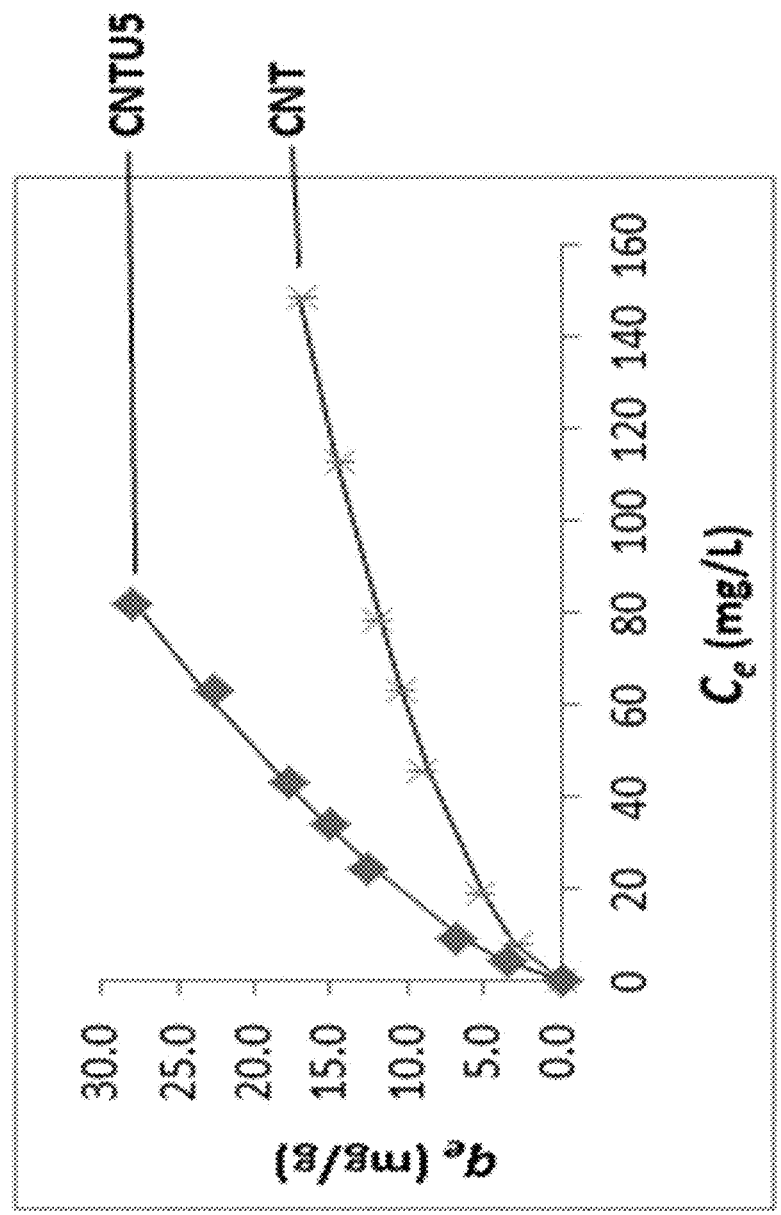
FIG. 17 is a graphical presentation of the adsorption isotherms fitted by the Freundlich model of CNT and CNTU5 for DBT adsorption. The adsorption time is 120 min, the adsorption temperature is 25° C., and the shaking speed is 200 rpm according to Example 4.
Figure 18:
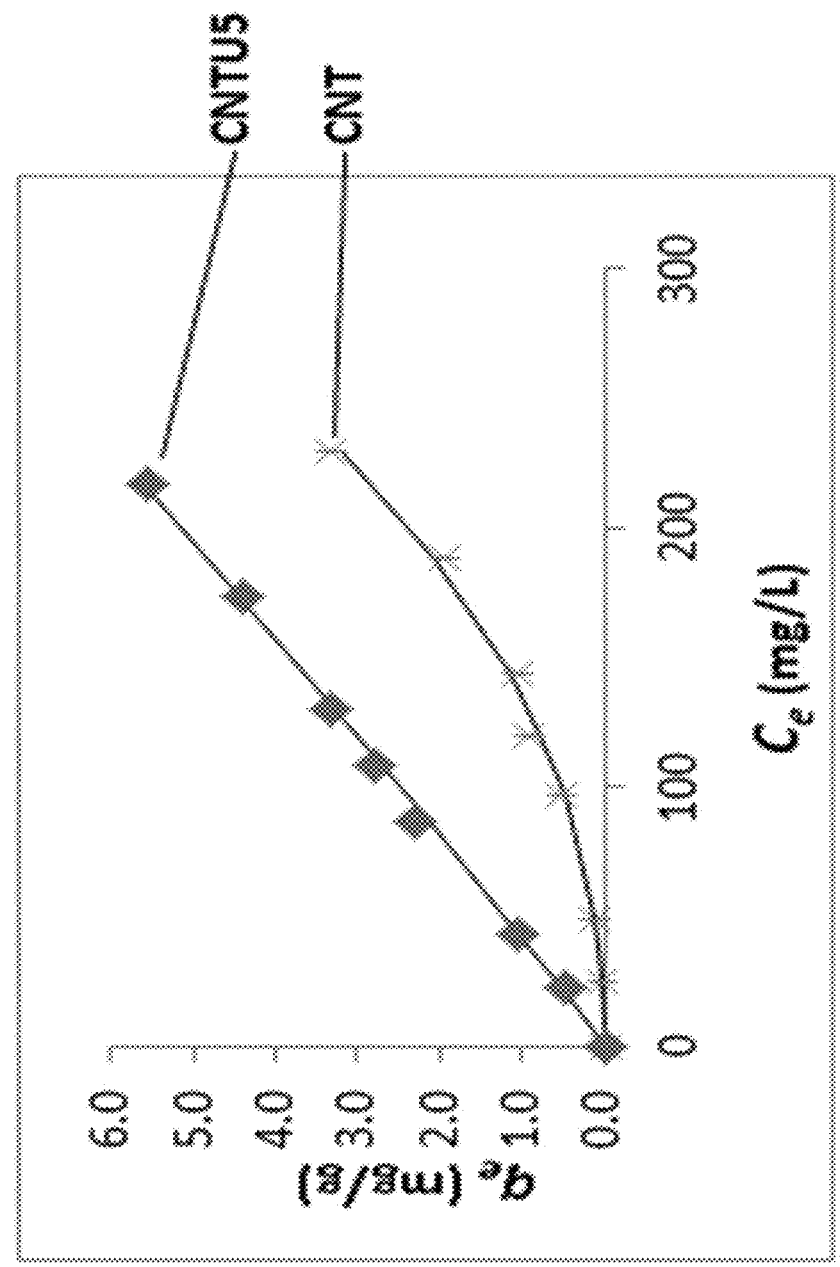
FIG. 18 is a graphical presentation of the adsorption isotherms fitted by the Freundlich model of CNT and CNTU5 for thiophene adsorption. The adsorption time is 120 min, the adsorption temperature is 25° C., and the shaking speed is 200 rpm according to Example 4.

The FE-TEM images of the raw CNTs are shown in FIGS. 7 and 8. The FE-TEM images of the UO$_3$ impregnated CNTs are shown in FIGS. 9 and 10. The CNTs were hollow and tubular in shape with many deflection sites. FIGS. 9 and 10 show the FE-TEM images of CNTs coated with UO$_3$ nanoparticles. The UO$_3$ nanoparticles had a diameter of 10-80 nm with spherical shapes.

3. Determination of the Surface Area, Total Pore Volume, and Surface pH of the Raw and UO$_3$ Impregnated Carbonaceous Materials The surface area and porosity of the raw and UO$_3$ impregnated carbonaceous materials were analyzed using about 0.1 g of each sample in an automated surface area analyzer Micrometrics (ASAP 2020 V4.02) at relative pressures between 0.01 to 1.00. The liquid nitrogen adsorption-desorption isotherms were measured after degassing all the carbonaceous materials at 200° C. and at a pressure of 10×10$^{-6}$ Torr. The Brunauer-Emmett-Teller (BET) and the t-plot methods were used to calculate the surface area (SA), while the total pore volume (V) was calculated from the t-Plot method only (C. Lastoskie, K. E. Gubbins, N. Quirke, Pore size distribution analysis of microporous carbons: a density functional theory approach, The journal of physical chemistry, 97 (1993) 4786-4796; B. C. Lippens, J. De Boer, Studies on pore systems in catalysts: V. The t method, Journal of Catalysis, 4 (1965) 319-323.—each incorporated herein by reference in its entirety).

The surface pH of the raw and UO$_3$ impregnated carbonaceous materials was measured by suspending 0.20 g of each dried material in 10 ml of distilled water followed by sonication for 2 hours. The sonicated suspension was filtered, and the pH of the filtrated solution was measured using a pH meter (Thermo Scientific CyberScan pH 1500).

Referring to Table 2, the carbonaceous materials in descending order of the BET surface area were ACU5>AC>CNT>CNTU5, and the carbonaceous materials in descending order of the micropore volume based on the t-plot were AC>ACU5>CNTU5>CNT.

TABLE 2

BET surface area, t-plot micropore volume, and surface pH of AC, ACU5, CNT, and CNTU5

| Adsorbent | BET SA (m$^2$/g) | t-Plot Micropore V (cm$^3$/g) | pH |
|---|---|---|---|
| AC | 882.237 | 0.466 | 9.35 |
| ACU5 | 927.82 | 0.373 | 7.99 |
| CNT | 217.235 | — | 5.81 |
| CNTU5 | 203.78 | 0.008 | 5.40 |

Impregnation of the (raw) AC with uranyl oxide led to an increase in the BET surface area and a decrease in the micropore volume as compared to the (raw) AC, because of the particle accumulation in the micropores of AC. In contrast, compared to the raw CNTs, the CNTs impregnated with uranyl oxide displayed a decrease in the BET surface area and an increase in the micropore volume, which may be explained by an agglomeration of the impregnated CNTs that form some micropore structures. Also referring to Table 2, the UO$_3$ impregnated AC and CNTs had lower surface pH values than their raw counterparts, resulting from the accumulation of uranyl oxide, a Lewis acid, on the surfaces of AC and CNTs.

Example 4

Adsorption of Thiophene and Dibenzothiophene (DBT) with the Raw and UO$_3$ Impregnated Carbonaceous Materials Thiophene and DBT concentrations were measured before and after the adsorption using an HPLC-UV system (Agilent Technology 1260 Infinity series). The chromatographic parameters are summarized in Table 3.

TABLE 3

Chromatographic conditions

| Parameters | Description |
|---|---|
| Mobile Phase | 100% n-Hexane |
| Analytical column | Silica, 5 μm (200 × 4.6 mm i.d.) |
| Guard column | C18, 5 μm (10 × 4.6 mm i.d.) |
| Auto-sampler temperature | 24° C. |
| Flow rate | 1.0 mL/min |
| Back pressure | 29-30 bar |
| Column temperature | 24° C. |
| Injection volume | 5 μL |
| Wave length | In first 3.5 min the λ is 235 nm for thiophene and from 3.5 to 5.0 min the λ is 280 for DBT and Naphthalene detection. |
| Total run time | 5.5 min. |

The adsorption of thiophene and DBT by the raw and UO$_3$ impregnated AC and CNTs was investigated at room temperature (T=25° C.). Different concentrations of thiophene and DBT (i. e. 25, 50, 100, 125, 150, 200 and 250 mg/L) were dissolved in 25 mL of n-hexane as a model diesel, while the amount of each adsorbent was fixed at 150 mg. The concentrations of thiophene and DBT before and after the adsorption were measured using HPLC coupled with a UV detector. In the selectivity study in Example 7, the wavelength switching mode was used to measure the concentrations of thiophene, naphthalene (Naph) and DBT simultaneously in the model diesel. FIGS. 11-18 show the adsorption isotherms of DBT and thiophene with AC, CNT, ACU5, and CNTU5 fitted by the Langmuir and Freundlich isotherm models according to Equations 1 and 2, respectively.

$$q_e = \frac{(Q_{max}bC_e)}{(1+bC_e)} \quad (1)$$

$$q_e = K_F C_e^{1/n} \quad (2)$$

where $q_e$ (mg/g) is the adsorption capacity at equilibrium, $Q_{max}$ (mg/g) is the maximum monolayer adsorption capacity, b is the Langmuir constant, $C_e$ (mg/L) is the concentration of a sulfur compound in the solution at equilibrium, $K_F$ is the Freundlich constant, and n is the heterogeneity parameter which indicates the degree of the adsorbents surface heterogeneity. Equation (1) can be rearranged to give the following linear form:

$$\frac{C_e}{q_e} = \frac{1}{bQ_{max}} + \frac{C_e}{Q_{max}} \quad (3)$$

The linear form of Equation (2) can be written as:

$$\ln(q_e) = \ln(K_F) + \frac{1}{n}\ln(C_e) \quad (4)$$

The $q_e$ can be calculated using the following Equation (5):

$$q_e = \frac{V(C_o - C_e)}{m} \quad (5)$$

Where V (mL) is the volume of solution in the adsorption experiment, $C_o$ (mg/L) is the initial concentration of the sulfur compound in the solution, and m (mg) is the mass of an adsorbent used in the adsorption experiment.

The Langmuir model describes the adsorption on a homogeneous adsorbent surface with the same adsorption energy without repulsion or attraction between the adsorbate molecules at the adsorption sites, whereas the Freundlich model assumes that the adsorption takes place at a heterogeneous adsorbent surface with multi-layered adsorption capacity.

The maximum monolayer adsorption capacity ($Q_{max}$) for each adsorbent was obtained from the slope of the linear Langmuir isotherm (Equation 3). The n values for all the adsorbents were obtained from the slope of the linear Freundlich isotherm (Equation 4). Larger n and $K_F$ values indicate a greater degree of surface heterogeneity and a higher adsorption capacity of an adsorbent, respectively (L. Li, P. A. Quinlivan, D. R. Knappe, Carbon, 40 (2002) 2085-2100.—incorporated herein by reference in its entirety).

As shown in Table 4, the n and $K_F$ values of the $UO_3$ impregnated adsorbents for thiophene adsorption were larger than those of their raw counterparts, indicating that the $UO_3$ impregnation increased the adsorbents surface heterogeneity and adsorption capacity for thiophene. Compared to their raw counterparts, the $UO_3$ impregnated adsorbents had significantly increased $K_F$ values for DBT adsorption, indicating their higher adsorption capacity for DBT, however, they had somewhat lower n values. Nonetheless, that the n values of all the adsorbents, which ranged from 1.1 to 1.7, were higher than 1 indicates the tendency of DBT for adsorption.

The goodness of fit values ($R^2$, the squares of the correlation coefficients) of the linear Freundlich adsorption isotherm were greater than those of the linear Langmuir adsorption isotherm for the thiophene and DBT adsorption. Additionally, the experimental data for the thiophene adsorption with AC, CNTs, and CNTU5 did not fit the Langmuir adsorption isotherm, but fitted the Freundlich adsorption isotherm, indicating that thiophene and DBT were likely adsorbed by forming multiple layers on the adsorbents.

The maximum monolayer adsorption capacity ($Q_{max}$) value for DBT adsorption with each adsorbent was obtained from the slope of the linear Langmuir adsorption isotherm. However, the $Q_{max}$ value for thiophene adsorption was calculated only for ACU5, because the thiophene adsorption with the other adsorbents did not fit the Langmuir adsorption isotherm model but fitted the Freundlich isotherm adsorption model.

Referring to Table 4, the $Q_{max}$ of ACU5 for DBT adsorption was 108.95±5.99 mg/g, which is about 150% higher than that of AC. ACU5 had the highest maximum monolayer adsorption capacity ($Q_{max}$) for DBT followed by, in descending order, CNTU5, AC, and CNT. The increase in DBT adsorption from the model diesel using the $UO_3$ impregnated AC and CNT may result from introducing additional adsorption sites provided by $UO_3$ as a Lewis acid, which can interact with the sulfur compounds through a π complexation between the π electrons of the benzene rings in an organosulfur compound or a lone pair of electrons of the sulfur atom and the empty d and f orbitals of the uranium atom.

Example 5

Adsorption Kinetics of the $UO_3$ Impregnated Carbonaceous Materials for DBT and Thiophene Adsorption To study the DBT and thiophene adsorption kinetics of the $UO_3$ impregnated carbonaceous adsorbents, a 25 mL

TABLE 4

Freundlich and Langmuir parameters and coefficients of determination for thiophene and DBT adsorption with the raw and $UO_3$ impregnated carbonaceous materials

| | Freundlich | | | | | |
|---|---|---|---|---|---|---|
| | Thiophene | | | DBT | | |
| Adsorbent | $n^1$ | $K_F^2$ $(mg^{(1-1/n)} mg^{-1} L^{1/n})$ | $R^2$ | $n^1$ | $K_F^2$ $(mg^{(1-1/n)} mg^{-1} L^{1/n})$ | $R^2$ |
| AC | 0.83 ± 0.04 | (1.1 ± 0.3) × 10$^{-2}$ | 0.9898 | 1.7 ± 0.1 | 4.9 ± 0.5 | 0.9747 |
| CNT | 0.45 ± 0.02 | (2.0 ± 0.8) × 10$^{-5}$ | 0.9934 | 1.69 ± 0.04 | (8.9 ± 0.5) × 10$^{-1}$ | 0.9968 |
| ACU5 | 1.18 ± 0.02 | (7.0 ± 0.6) × 10$^{-2}$ | 0.9979 | 1.17 ± 0.05 | 8.7 ± 0.4 | 0.9913 |
| CNTU5 | 0.91 ± 0.02 | (1.6 ± 0.2) × 10$^{-2}$ | 0.9964 | 1.27 ± 0.04 | 1.06 ± 0.08 | 0.9961 |

| | Langmuir | | | | | |
|---|---|---|---|---|---|---|
| | Thiophene | | | DBT | | |
| | $Q_{max}^3$ (mg/g) | $b^4$ (dm$^3$/mg) | $R^2$ | $Q_{max}^3$ (mg/g) | $b^4$ (dm$^3$/mg) | $R^2$ |
| AC | — | — | 0.4657 | 42 ± 3 | (1.07 ± 0.06) × 10$^{-1}$ | 0.9795 |
| CNT | — | — | 0.6969 | 24 ± 2 | (1.5 ± 0.1) × 10$^{-2}$ | 0.9702 |
| ACU5 | 22 ± 2 | (2.0 ± 0.1) × 10$^{-3}$ | 0.8335 | 109 ± 6 | (8.9 ± 0.2) × 10$^{-2}$ | 0.9374 |
| CNTU5 | — | — | 0.4159 | 64 ± 2 | (1.15 ± 0.02) × 10$^{-2}$ | 0.9286 |

Figure 19:
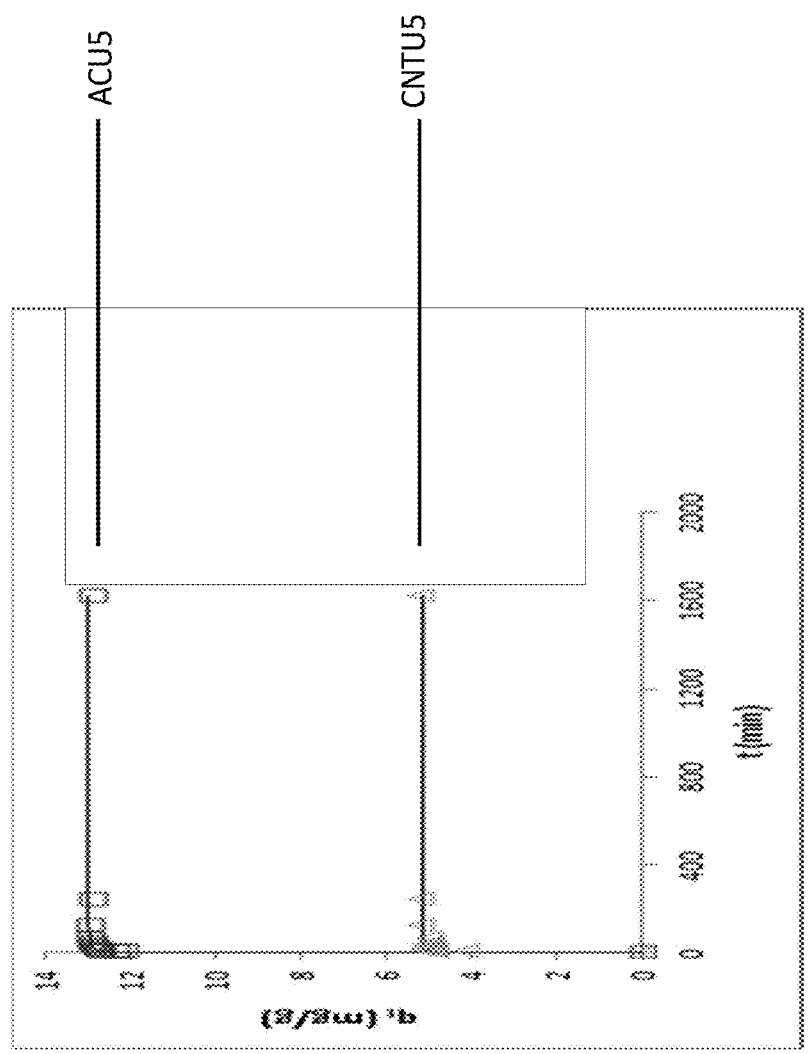
FIG. 19 is a graphical presentation of the adsorption capacity $q_t$ for thiophene with time (t) using the $UO_3$ impregnated carbonaceous materials ACU5 and CNTU5 as adsorbents and fitted by the pseudo-second order kinetic model. The temperature is 25° C., the shaking speed is 200 rpm, the adsorbent amount is 75 mg, and the initial concentration ($C_0$) of thiophene is 250 mg/L according to Example 5.
Figure 20:
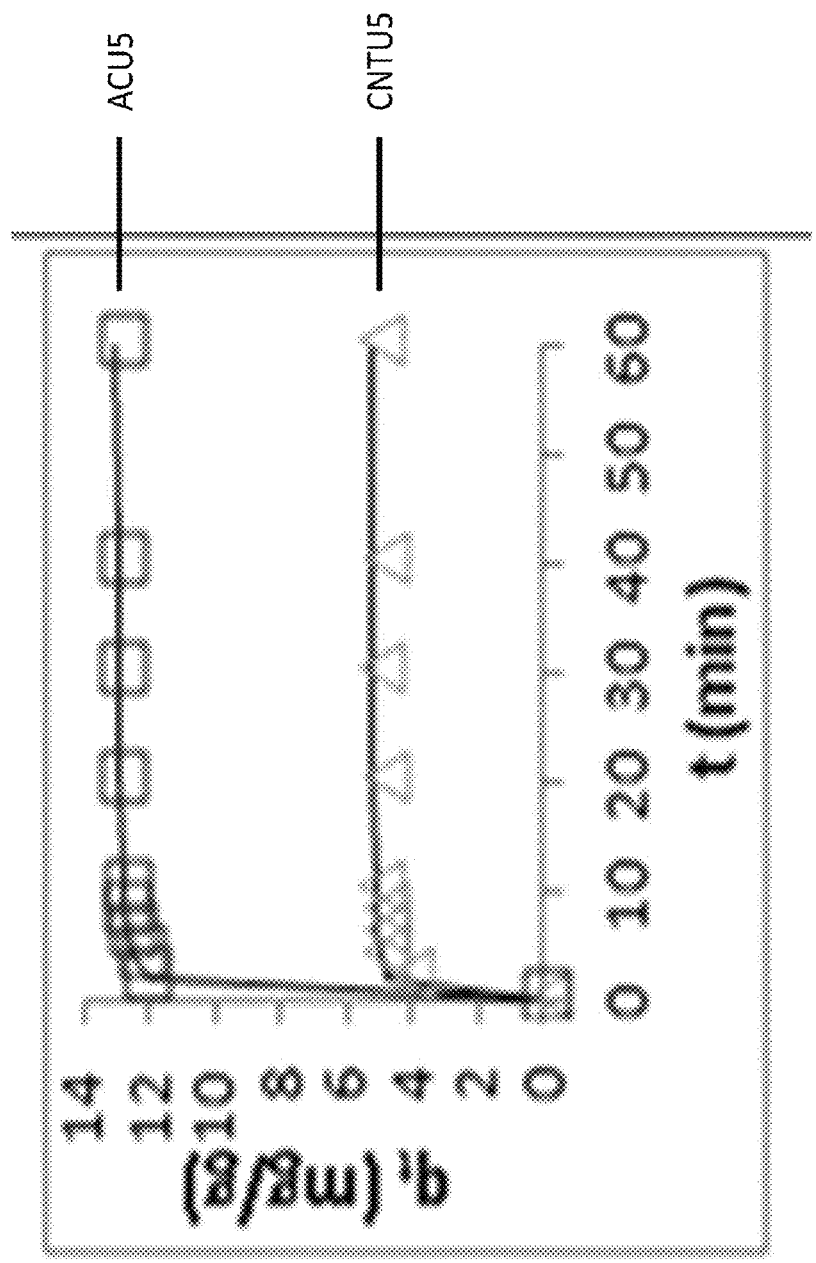
FIG. 20 is a magnified version of FIG. 19, showing in greater detail the adsorption capacity $q_t$ for thiophene with time (t) from 0 to 60 min using the $UO_3$ impregnated carbonaceous materials ACU5 and CNTU5 as adsorbents and fitted by the pseudo-second order kinetic model. The temperature is 25° C., the shaking speed is 200 rpm, the adsorbent amount is 75 mg, and the initial concentration ($C_0$) of thiophene is 250 mg/L according to Example 5.

[1]The uncertainty was calculated on the basis of the uncertainty in the slope of the Freundlich linearized equation.
[2]The uncertainty was calculated on the basis of the uncertainty in the intercept of the Freundlich linearized equation.
[3]The uncertainty was calculated on the basis of the uncertainty in the slope of the Langmuir linearized equation.
[4]The uncertainty was calculated on the basis of the uncertainty in the intercept of the Langmuir linearized equation n-hexane solution with an initial concentration of 250 mg/L of either DBT or thiophene was mixed with 75 mg of each $UO_3$ impregnated carbonaceous adsorbent in a capped vial kept under shaking for various periods of time, i.e. 2, 4, 6, 8, 10, 20, 30, 40, 60 120, 240 and 1560 minutes. The adsorbent was then allowed to settle, and a 5 mL sample was removed and filtered. 5 µL of the filtered sample were analyzed using HPLC-UV to determine the remaining and removed sulfur compound concentrations. Referring to FIGS. 19 and 20, the adsorption rate of thiophene with ACU5 or CNTU5 reached an equilibrium quickly, i.e. within 10 minutes of mixing.

Figure 21:
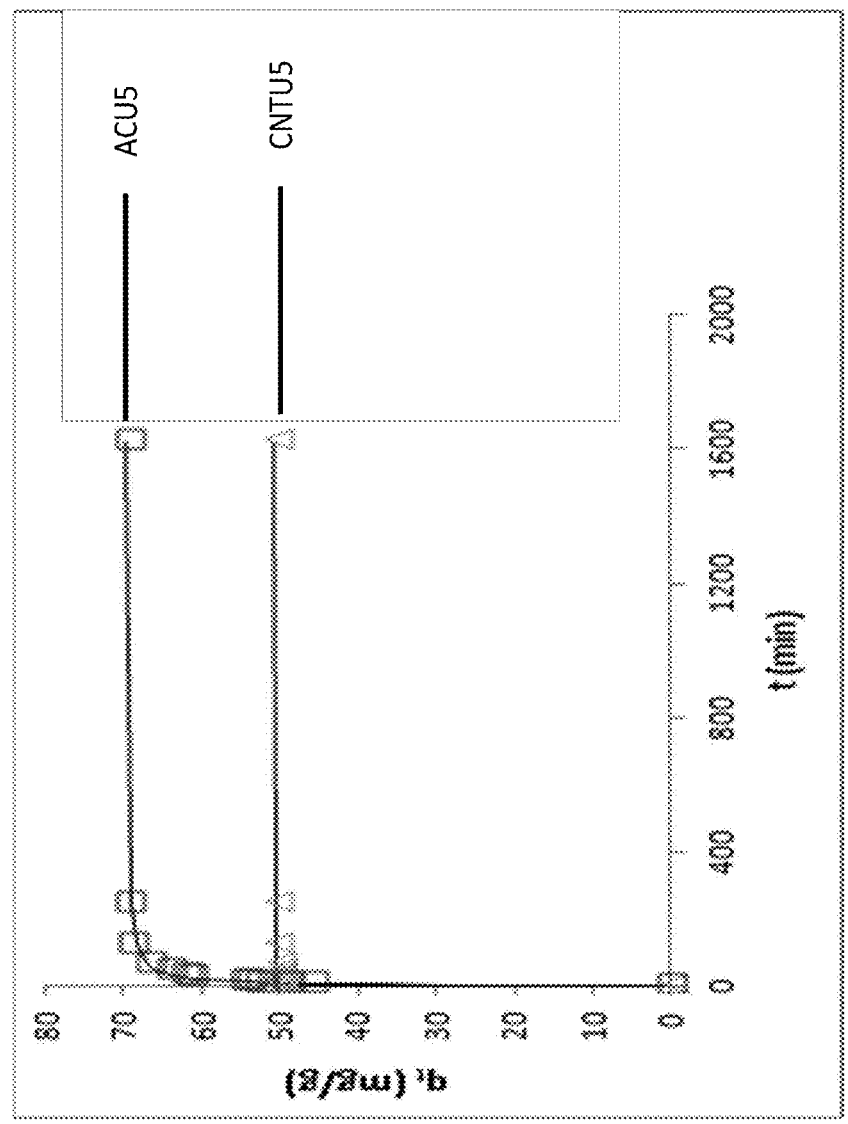
FIG. 21 is a graphical presentation of the adsorption capacity $q_t$ for DBT with time (t) using the $UO_3$ impregnated carbonaceous materials ACU5 and CNTU5 as adsorbents and fitted by the pseudo-second order kinetic model. The temperature is 25° C., the shaking speed is 200 rpm, the adsorbent amount is 75 mg, and the initial concentration ($C_0$) of DBT is 250 mg/L according to Example 5.
Figure 22:
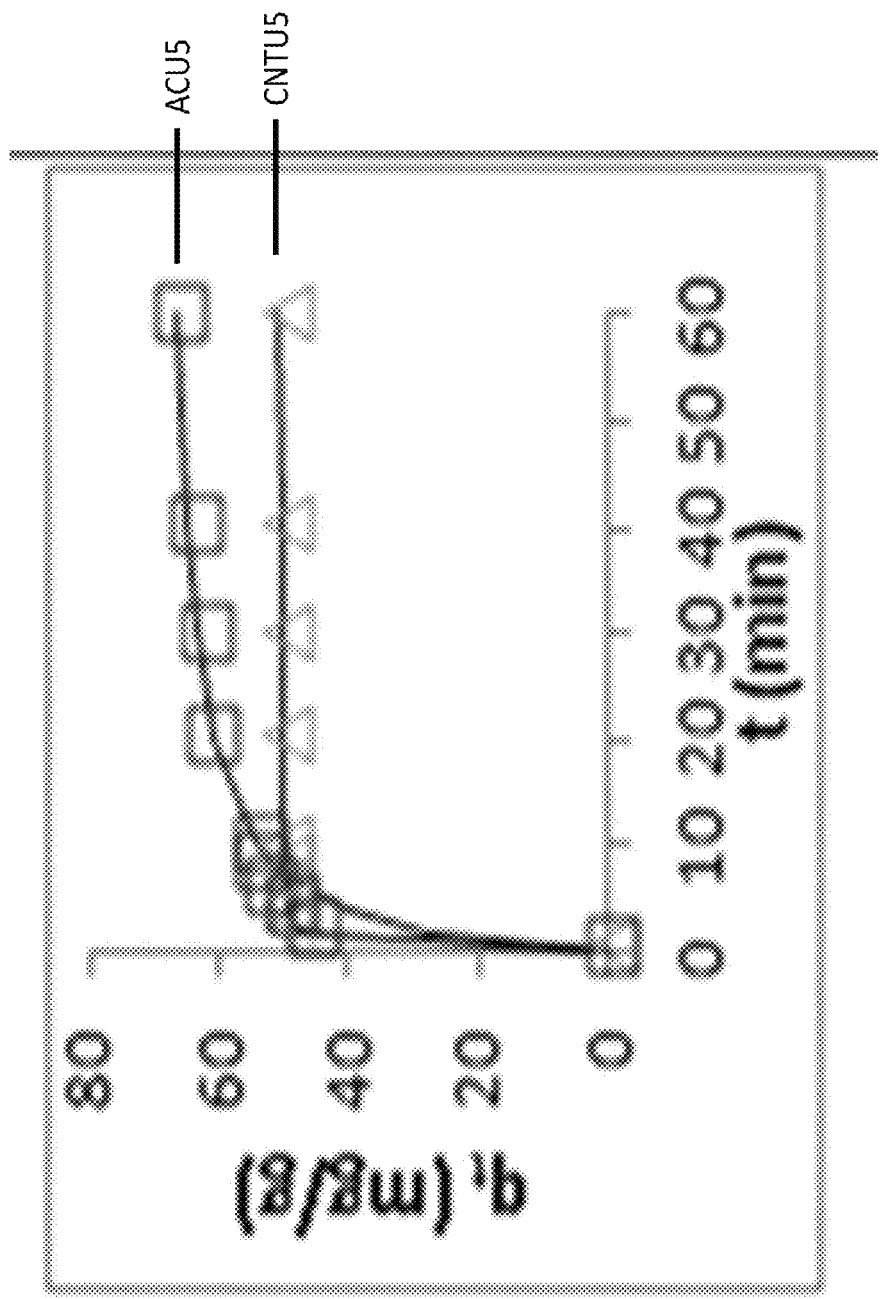
FIG. 22 is a magnified version of FIG. 21, showing in greater detail the adsorption capacity $q_t$ for DBT with time (t) from 0 to 60 min using the $UO_3$ impregnated carbonaceous materials ACU5 and CNTU5 as adsorbents and fitted by the pseudo-second order kinetic model. The temperature is 25° C., the shaking speed is 200 rpm, the adsorbent amount is 75 mg, and the initial concentration ($C_0$) of DBT is 250 mg/L according to Example 5.

Referring to FIGS. 21 and 22, the adsorption rate of DBT with CNTU5 reached an equilibrium within 10 minutes of mixing, whereas the adsorption rate of DBT with ACU5 needed a longer time to reach an equilibrium, i.e. after 1 hour of mixing. As shown in FIG. 22, most of the DBT was adsorbed by ACU5 during the first 10 minutes, however, the adsorption then increased slowly, reaching the maximum after 1 hour of mixing. The experimental adsorption capacities ($q_{e,exp}$) of ACU5 and CNTU5 for thiophene and DBT are presented in Table 5. The initial fast adsorption is attributed to a large number of available active adsorption sites. The subsequent slow attainment of the maximal adsorption is due to the saturation of the active sites on the surface of the adsorbent and the repulsion force between the sulfur compound molecules adsorbed on the adsorbent and the free sulfur compound molecules remaining in the model diesel.

$$\ln(q_e - q_t) = \ln(q_e) - k_1 t \tag{6}$$

$$\frac{t}{q_t} = \frac{1}{q_e^2 k_2} + \frac{t}{q_e} \tag{7}$$

Where $q_e$ (mg/g) is the adsorption capacity at equilibrium, $q_t$ (mg/g) is the adsorption capacity at time t (min), $k_1$ (min$^{-1}$) is the pseudo-first order rate constant, and $k_2$ (g mg$^{-1}$ min$^{-1}$) is the pseudo-second order rate constant. The DBT and thiophene adsorption data did not fit the pseudo-first order kinetic model, since the squared correlation coefficients ($R^2$) were very low, and the difference between the experimental adsorption capacity ($q_{e,exp}$) and the calculated adsorption capacity ($q_{e,pred}$) was very high, agreeing with Ho and McKay (Y. Ho, G. McKay, Process Safety and Environmental Protection, 76 (1998) 332-340.—incorporated herein by reference in its entirety) that the Lagergren pseudo-first order equation generally fits the first 20 to 30 minutes, but not the entire time range, of an adsorption process in most chemisorption cases. By contrast, the $R^2$ values were unity by fitting with the pseudo-second order model for the adsorption of both DBT and thiophene, with the experimental adsorption capacity values ($q_{e,exp}$) being very close to the calculated adsorption capacity values ($q_{e,pred}$) as shown in Table 5.

The effect of mass transfer resistance on the binding of DBT or thiophene to the adsorbents was verified using the Weber and Morris intra-particle diffusion model. The intra-particle diffusion resistance affecting adsorption was examined using Equation 8 (Weber, W. J. and Morris, J. C., Kinetics of adsorption on carbon from solution. Journal of the Sanitary Engineering Division 1963; 89(2):31-60-incorporated herein by reference in its entirety):

$$q_t = k_{id} t^{0.5} + C \tag{8}$$

Where $q_t$ (mg/g) is the adsorption capacity at time t (min), $k_{id}$ is the intra-particle diffusion rate constant (mg/gmin$^{0.5}$), and C is a constant related to the thickness of the boundary

TABLE 5

Pseudo-first order and pseudo-second order parameters of the $UO_3$ impregnated carbonaceous materials for thiophene and DBT adsorption

| | Pseudo-First order Parameters | | | | | | | |
| --- | --- | --- | --- | --- | --- | --- | --- | --- |
| | Thiophene | | | | DBT | | | |
| Adsorbent | $q_{e\,exp}$ | $q_{e\,pred}$[1] | $k_1$[2] | $R^2$ | $q_{e\,exp}$ | $q_{e\,pred}$[1] | $k_1$[2] | $R^2$ |
| ACU5 | 12.97 | 0.77 ± 0.16 | (1.32 ± 0.21) × 10$^{-1}$ | 0.9090 | 69.57 | 20.06 ± 1.33 | (3.10 ± 0.15) × 10$^{-2}$ | 0.9828 |
| CNTU5 | 5.30 | 0.56 ± 0.2 | (2.17 ± 1.04) × 10$^{-2}$ | 0.5194 | 50.87 | 0.65 ± 0.04 | (7.32 ± 1.98) × 10$^{-3}$ | 0.7742 |

| | Pseudo-Second order Parameters | | | | | | | |
| --- | --- | --- | --- | --- | --- | --- | --- | --- |
| | Thiophene | | | | DBT | | | |
| Adsorbent | $q_{e\,exp}$ | $q_{e\,pred}$[3] | $k_2$[4] | $R^2$ | $q_{e\,exp}$ | $q_{e\,pred}$[3] | $k_2$[4] | $R^2$ |
| ACU5 | 12.97 | 13.03 ± 0.01 | 0.52 ± 0.11 | 1.0000 | 69.57 | 69.90 ± 0.58 | (6.04 ± 0.86) × 10$^{-3}$ | 0.9994 |
| CNTU5 | 5.30 | 5.29 ± 0.04 | 0.31 ± 0.14 | 0.9995 | 50.87 | 50.82 ± 0.09 | 0.20 ± 0.11 | 1.0000 |

[1]The uncertainty was calculated based on the uncertainty in the slope of the pseudo-first order linearized equation.
[2]The uncertainty was calculated based on the uncertainty in the intercept of the pseudo-first order linearized equation.
[3]The uncertainty was calculated based on the uncertainty in the slope of the pseudo-second order linearized equation.
[4]The uncertainty was calculated based on the uncertainty in the intercept of the pseudo-second order linearized equation.

The adsorption kinetics of the prepared adsorbents for DBT and thiophene was studied and fitted with the pseudo-first order kinetic model (Equation 6) reported by Lagergren (S. Lagergren, Kungliga Svenska Vetenskapsakademiens Handlingar, 24 (1898) 1-39.—incorporated herein by reference in its entirety), and the pseudo-second order kinetic model (Equation 7) reported by Ho (Y. Ho, G. McKay, Process Safety and Environmental Protection, 76 (1998) 332-340.—incorporated herein by reference in its entirety).

layer (mg/g). Thus, the diffusion constant $k_{id}$ can be obtained from the slope of a linear graph of $q_t$ versus the square root of time. If the linear graph goes through the origin, then intra-particle diffusion is the sole rate controlling step.

Figure 23:
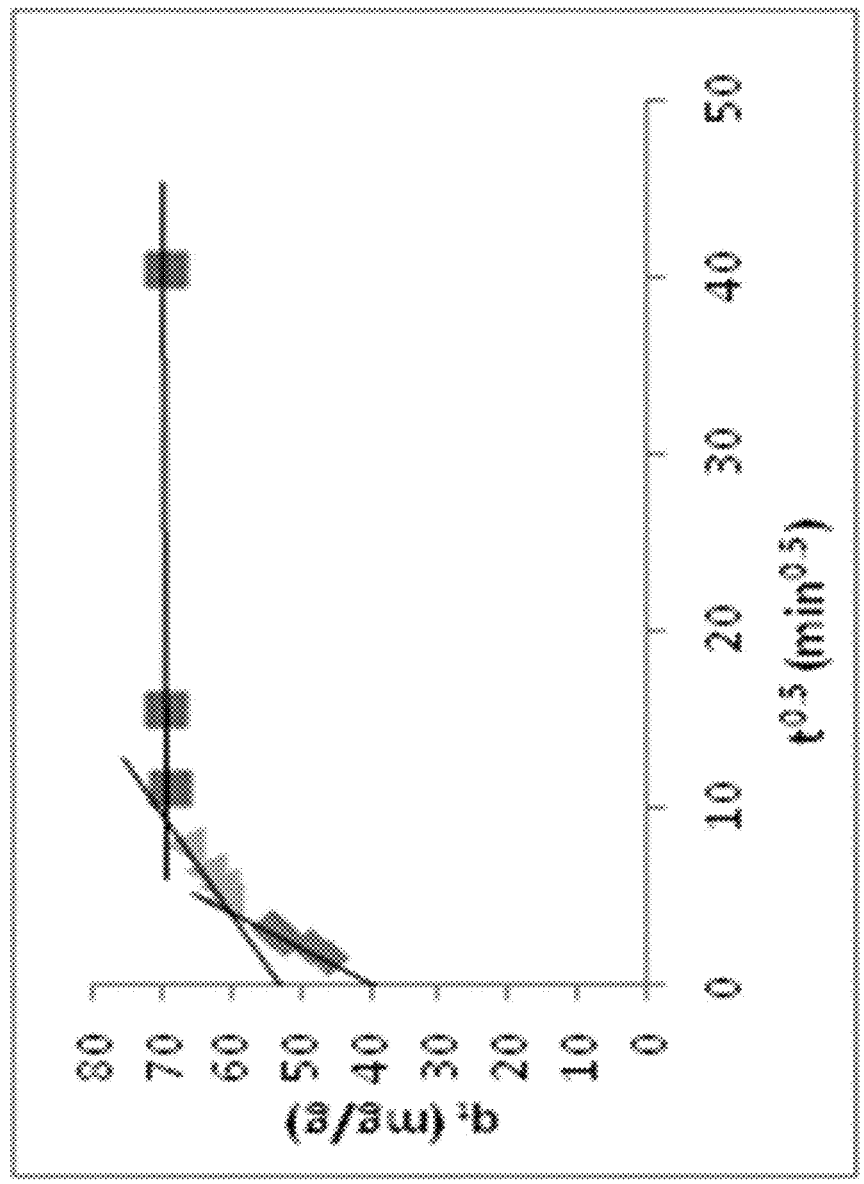
FIG. 23 is a graphical presentation of the adsorption capacity $q_t$ with the square root of time $t^{0.5}$ fitted by the intra-particle diffusion model for DBT adsorption using ACU5 as the adsorbent according to Example 5.
Figure 24:
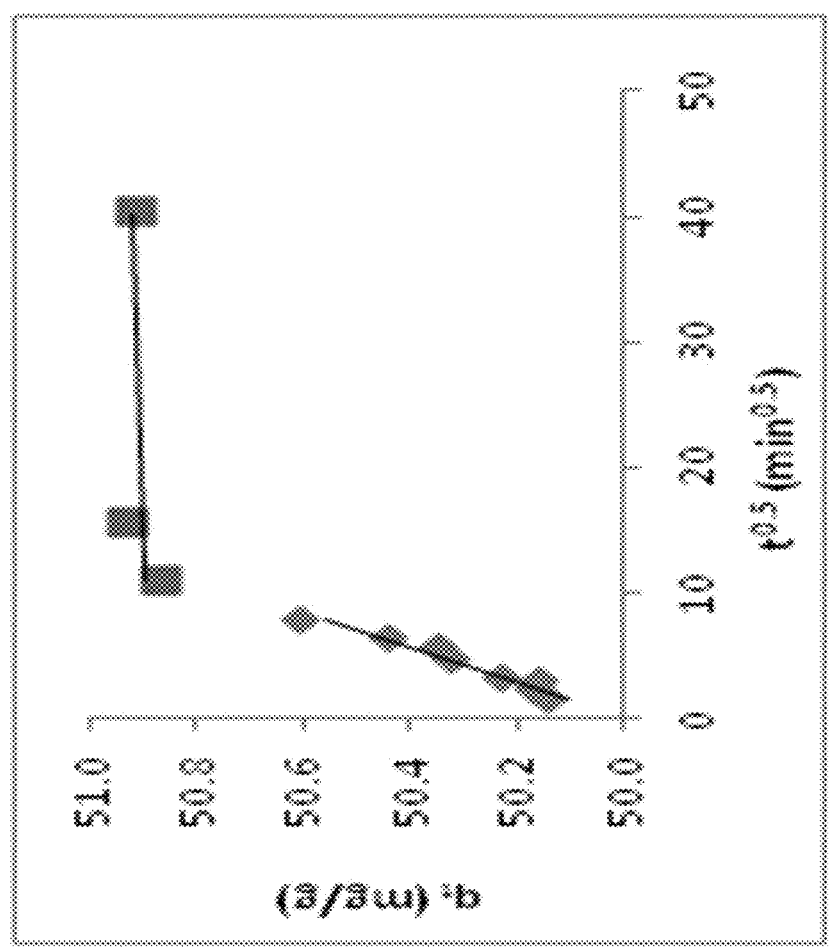
FIG. 24 is a graphical presentation of the adsorption capacity $q_t$ with the square root of time $t^{0.5}$ fitted by the intra-particle diffusion model for DBT adsorption using CNTU5 as the adsorbent according to Example 5.
Figure 25:
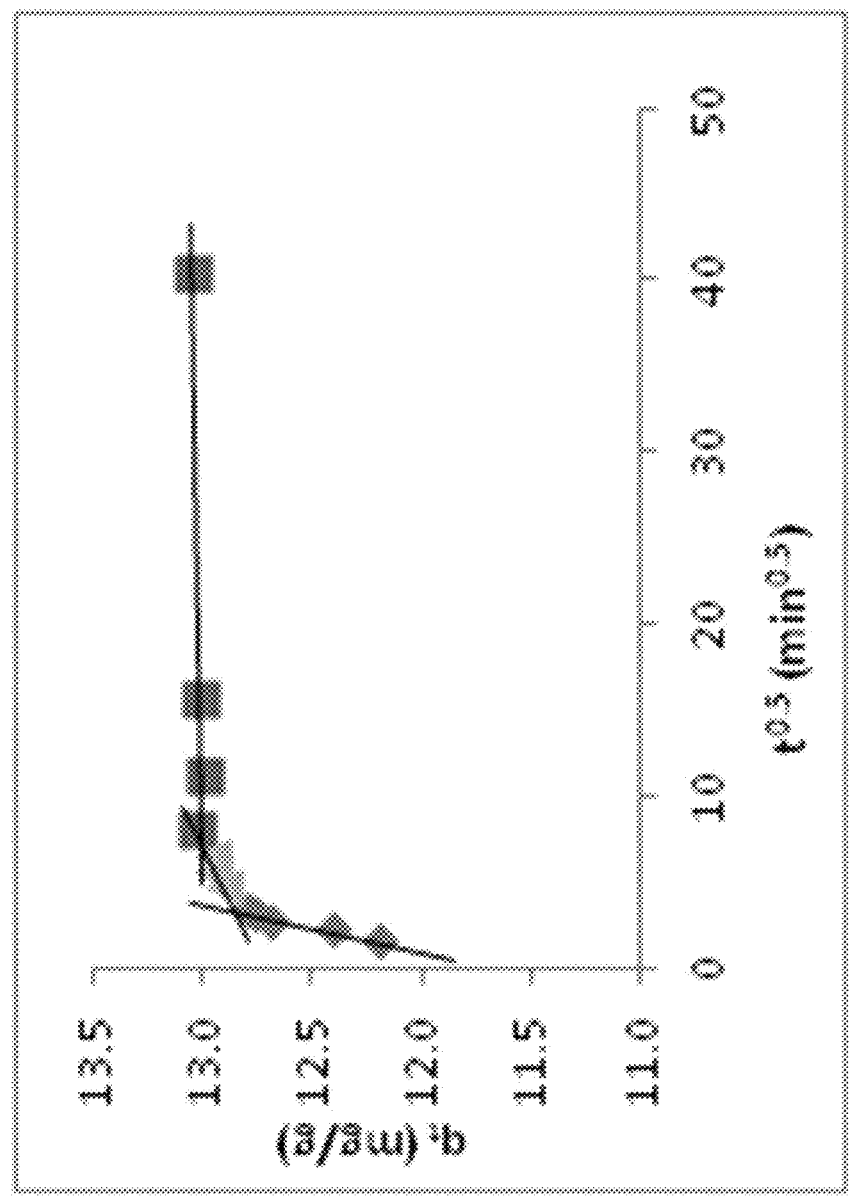
FIG. 25 is a graphical presentation of the adsorption capacity $q_t$ with the square root of time $t^{0.5}$ fitted by the intra-particle diffusion model for thiophene adsorption using ACU5 as the adsorbent according to Example 5.
Figure 26:
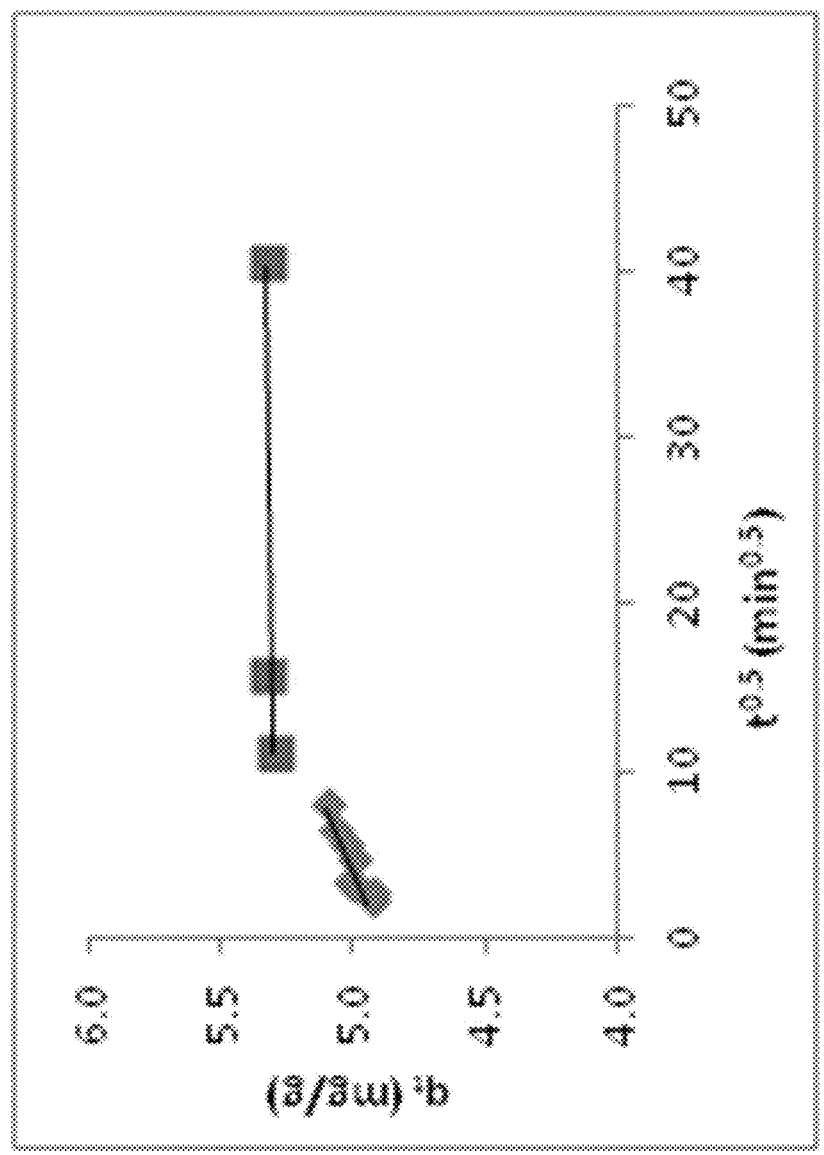
FIG. 26 is a graphical presentation of the adsorption capacity $q_t$ with the square root of time $t^{0.5}$ fitted by the intra-particle diffusion model for thiophene adsorption using CNTU5 as the adsorbent according to Example 5.

FIGS. 23 and 24 show the graphs of $q_t$ versus $t^{0.5}$ for DBT with ACU5 and CNTU5, respectively. These results suggest that the adsorption processes involve multiple kinetic stages or adsorption rates (Weber, W. J. and Morris, J. C., Kinetics of adsorption on carbon from solution. Journal of the Sanitary Engineering Division 1963; 89(2):31-60-incorporated herein by reference in its entirety). ACU5 exhibited three stages, which can be attributed to three linear parts of the graph. The first sharp linear part can be attributed to surface adsorption or a fast adsorption step, followed by intra-particle diffusion, which produces a delay in the adsorption process. The third stage may be regarded as a diffusion through smaller pores, which is followed by the establishment of equilibrium. In contrast, CNTU5 exhibited two stages. The first stage involves a DBT diffusion from the bulk solution to the surface of the adsorbent to be adsorbed. The second stage involves an intra-particle diffusion through the adsorbent. The presence of micropores on the adsorbents validates this second stage of the intra-particle diffusion process.

Referring to FIGS. 23, 24, 25, and 26, the first linear part of each graph was used to calculate the intra-particle diffusion constant $k_{id}$ and C. Table 6 shows the calculated values of the diffusion constants for DBT and thiophene adsorption with ACU5 and CNTU5. A higher value of $k_{id}$ represents a faster net rate of adsorption resulting from slow desorption due to a stronger bonding between DBT or thiophene and the adsorbent.

TABLE 6

Intra-particles diffusion parameters for DBT and thiophene adsorption with ACU5 and CNTU5

| Adsorbents | Intra-particles Diffusion Parameters | | |
|---|---|---|---|
| | $K_{id}$ | C | $R^2$ |
| DBT | | | |
| ACU5 | 5.0462 | 39.263 | 0.9634 |
| CNTU5 | 0.0716 | 50.004 | 0.9586 |
| Thiophene | | | |
| ACU5 | 0.3691 | 11.698 | 0.9411 |
| CNTU5 | 0.0266 | 4.8972 | 0.8455 |

Example 6

Figure 27:
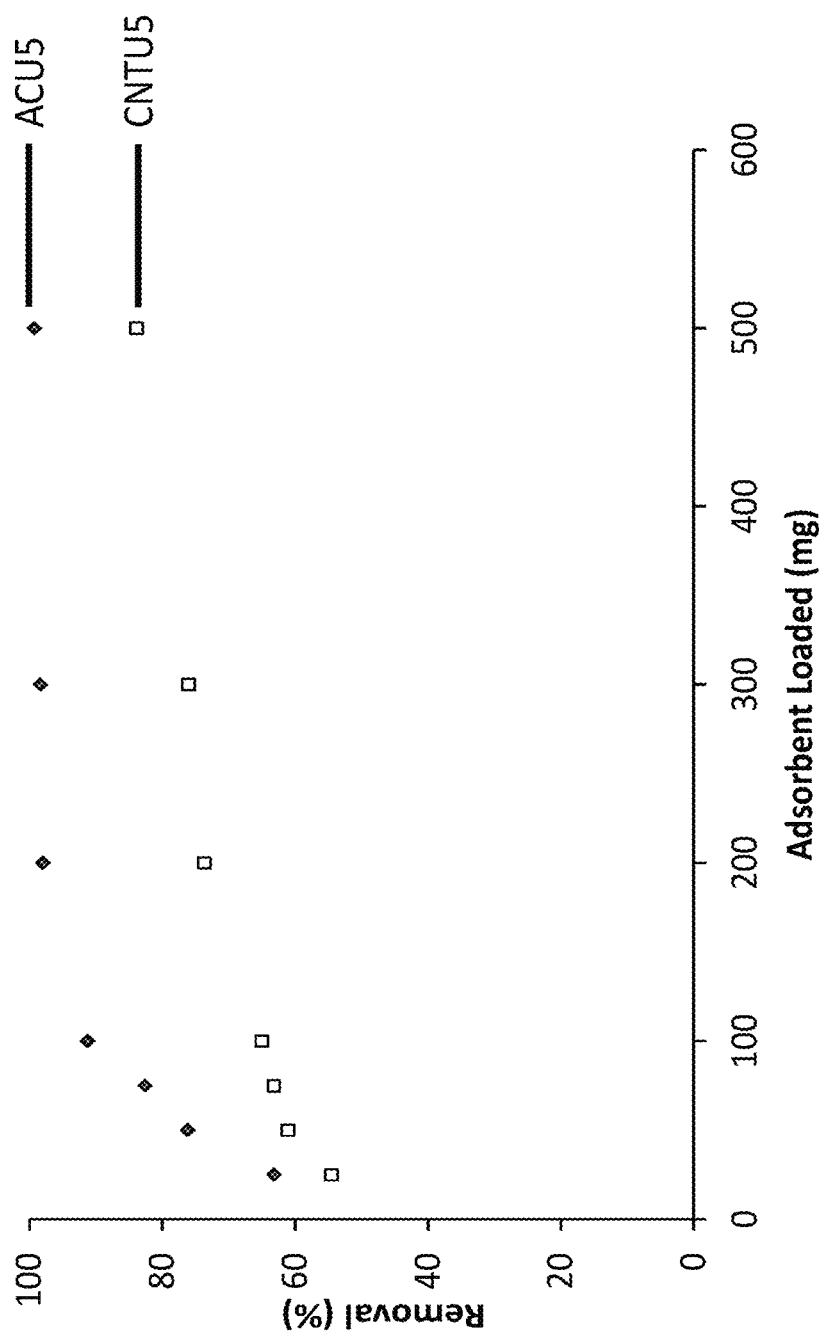
FIG. 27 is a graphical presentation of the relationship between the mass of ACU5 and CNTU5 and the DBT removal efficiency. The DBT adsorption was performed at room temperature (25° C.), with the shaking speed of 200 rpm and the initial DBT concentration of 250 mg/L, and for 120 min according to Example 6.
Figure 28:
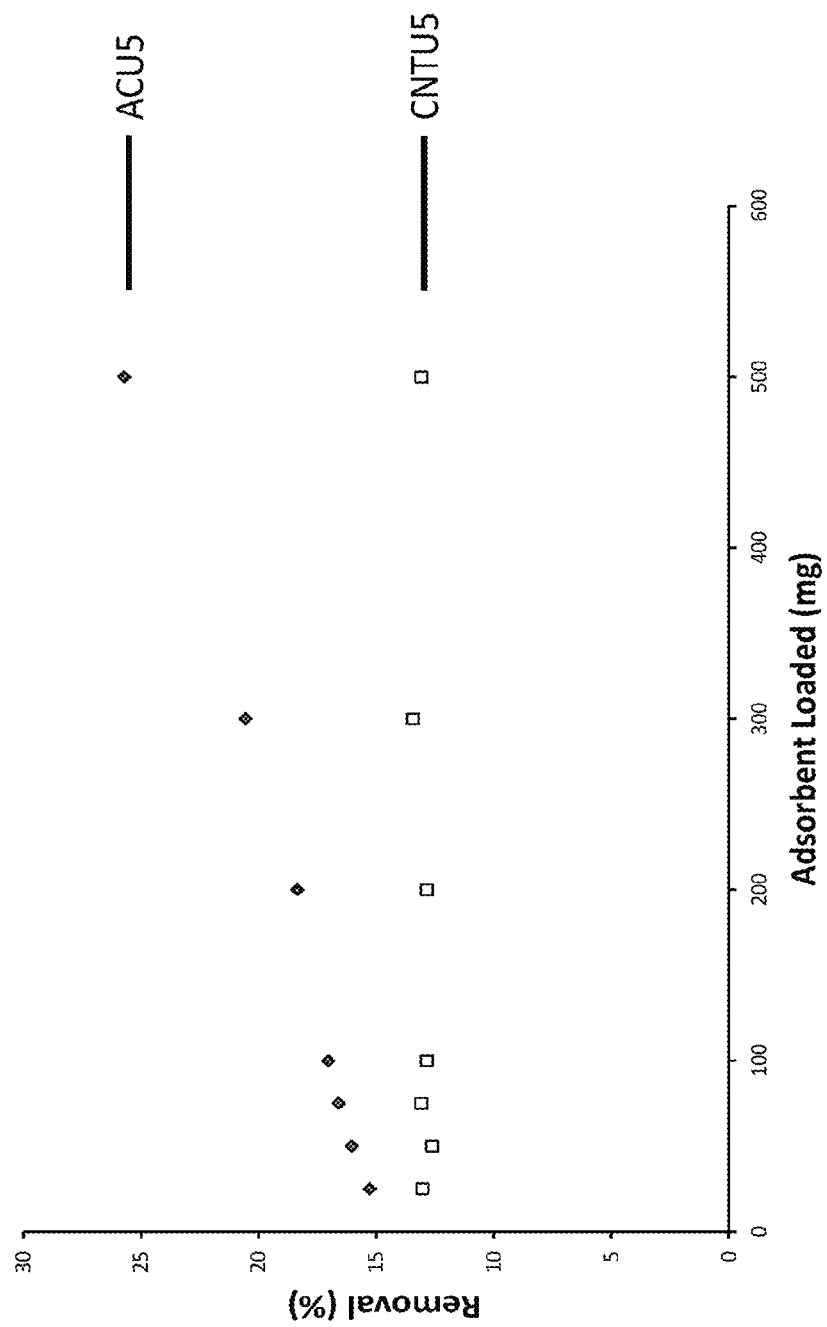
FIG. 28 is a graphical presentation of the relationship between the mass of ACU5 and CNTU5 and the thiophene removal efficiency. The thiophene adsorption was performed at room temperature (25° C.), with the shaking speed of 200 rpm and the initial thiophene concentration of 250 mg/L, and for 120 min according to Example 6.

Effect of the Dosages of the $UO_3$ Impregnated Carbonaceous Materials on the DBT and Thiophene Adsorption Efficiencies The effect of the adsorbent dosage on removal of DBT and thiophene was studied by varying the mass of the adsorbents from 25 to 750 mg in 25 mL of n-hexane, a model diesel, at fixed room temperature (25° C.), shaking speed (200 rpm) and initial concentration ($C_o$) of the sulfur compounds (250 mg/L) as shown in FIGS. 27 and 28.

Referring to FIG. 27, increasing percentages of DBT were removed by the increasing mass of ACU5 or CNTU5. Referring to FIG. 28, increasing the mass of ACU5 resulted in an increase in the thiophene adsorption efficiency, whereas increasing the mass of CNTU5 had no effect on the adsorption efficiency of thiophene.

Referring to FIG. 27, at an adsorbent mass of 200 mg, a high removal efficiency of DBT was achieved with ACU5 (about 98%) or CNTU5 (about 75%). The maximum adsorption of DBT was achieved with 500 mg of ACU5 (99.5% removal) or CNTU5 (85% removal). Referring to FIG. 28, a similar trend of adsorption was observed when ACU5 or CNTU5 was used to remove thiophene from the model diesel, however, with the maximal removal efficiencies of only 26% and 15%, respectively.

The higher removal efficiency of DBT and thiophene using ACU5 compared to CNTU5 can be explained by ACU5 having a larger surface area and a larger micropore volume than CNTU5.

Example 7

Adsorption Selectivity of ACU5 and CNTU5 for DBT Relative to Thiophene and Naphthalene (Naph)

The selectivity of ACU5 and CNTU5 for removal of DBT relative to thiophene and Naph from n-hexane was studied. Thiophene was selected as a model molecule to represent small aromatic sulfur-containing compounds found in a hydrocarbon fuel, and Naph was selected to represent poly aromatic hydrocarbon (PAH) compounds in a hydrocarbon fuel with a molecular structure close to that of DBT.

The stock solution of the ternary mixture containing these three compounds (thiophene/DBT/Naph) in n-hexane was prepared with a concentration of 250 mg/L each for thiophene and DBT, and a concentration of 1000 mg/L for Naph to simulate the actual availability of the PAHs in a real fuel. 75 mg of each adsorbent were added to 25 mL of the n-hexane model diesel solution containing thiophene/DBT/Naph, and the batch adsorption experiments were performed with the n-hexane model diesel solution containing 25-250 mg/L each of thiophene and DBT and 100-1000 mg/L of naphthalene, with a shaking speed of 200 rpm, for an adsorption time of 120 min and at room temperature.

The concentrations of these three compounds were measured simultaneously using the HPLC-UV method before and after the adsorption equilibrium was achieved. The distribution coefficient was calculated for each compound based on the following Equation (9).

$$K_d = Q_e/C_e \quad (9)$$

Where $K_d$ is the distribution coefficient (L/g), $Q_e$ is the adsorption capacity (mg/g), and $C_e$ is the sulfur compound and Naph equilibrium concentration (mg/L). The distribution coefficient was used later to calculate the selectivity factor for DBT relative to thiophene and Naph according to the following Equation (10).

$$k = K_{d(DBT)}/K_{d(c)} \quad (10)$$

Where k expresses the adsorption selectivity factor using ACU5 and CNTU5, $K_d$ is the distribution coefficient and the subscript (c) is the competitor molecule (i.e thiophene or Naph).

As shown in Table 7, ACU5 and CNTU5 exhibited high adsorption capacities of about 59 and 43 mg/g for DBT, respectively, in the presence of the thiophene and naphthalene competitor molecules. The removal efficiencies for DBT using these adsorbents were around 7 times higher than that for Naph and 23 times higher than that for thiophene. The selectivity factors of DBT relative to Naph were 18.3 and 6.17 for ACU5 and CNTU5, respectively. The selectivity factors of DBT relative to thiophene were higher, being 69.1 for ACU5 and 14.1 for CNTU5.

TABLE 7

Adsorption selectivity of ACU5 and CNTU5 for DBT

| | Adsorbent | | | | | | | |
|---|---|---|---|---|---|---|---|---|
| | ACU5 | | | | CNTU5 | | | |
| Adsorbate | $Q_{max}$ (mg/g) | $K_d$ | K DBT/Naph | K DBT/Thio | $Q_{max}$ (mg/g) | $K_d$ | K DBT/Naph | K DBT/Thio |
| DBT | 59.2 | 0.622 | 18.3 | 69.1 | 43.9 | 0.253 | 6.17 | 14.1 |
| Thiophene | 2.20 | 0.009 | | | 4.20 | 0.018 | | |
| Naphthalene | 31.2 | 0.034 | | | 38.4 | 0.041 | | |

The preferential adsorption for DBT relative to thiophene and Naph can be explained by three main factors. First, the size of DBT is closer to the size of the adsorbent pores, resulting in DBT being trapped into the adsorbents better than thiophene and Naph. Second, the dipole moment of DBT is higher than those of thiophene and Naph, leading to stronger van der waals and π-π interactions between DBT and the adsorbents surface. Third, thiophene and naphthalene have lower basicity compared to DBT which is a Lewis base. Thus, there is a stronger acid-base interaction between DBT and $UO_3$ impregnated on the adsorbents surface, resulting in the higher adsorption capacity.

The invention claimed is:

1. A method of removing sulfur compounds from a hydrocarbon fluid, comprising:
    contacting the hydrocarbon fluid with an adsorbent comprising at least one carbonaceous material selected from the group consisting of activated carbon and carbon nanotubes doped with nanoparticles of uranyl oxide ($UO_3$),
    wherein the contacting forms a treated hydrocarbon fluid having a lower concentration of the sulfur compounds relative to the hydrocarbon fluid, and
    wherein the adsorbent has a weight ratio of C to U in the range from 9:1 to 17:1, and a weight ratio of C to O in the range from 5:1 to 13:1.

2. The method of claim 1, wherein the carbonaceous material is carbon nanotubes doped with nanoparticles of uranyl oxide ($UO_3$), and the carbon nanotubes are multi-walled carbon nanotubes.

3. The method of claim 2, wherein the adsorbent comprises multi-walled carbon nanotubes doped with nanoparticles of uranyl oxide, and wherein the multi-walled carbon nanotubes doped with the nanoparticles of uranyl oxide have a BET surface area of greater than about 200 $m^2/g$.

4. The method of claim 1, wherein the carbonaceous material is doped with the nanoparticles of uranyl oxide by incipient wetness impregnation.

5. The method of claim 1, wherein the hydrocarbon fluid comprises at least one selected from the group consisting of n-hexane, diesel, jet fuel, marine gas oil, and used motor oil, and wherein the sulfur compounds are at least one selected from the group consisting of benzothiophene (BT), alkyl-benzothiophene (alkyl-BT), dibenzothiophene (DBT), alkyl-dibenzothiophene (alkyl-DBT), and thiophene and derivatives thereof.

6. The method of claim 5, wherein the adsorbent comprises activated carbon doped with nanoparticles of uranyl oxide, the hydrocarbon fluid is n-hexane, the sulfur compounds are dibenzothiophene (DBT), and wherein the adsorbent removes at least about 95% of the DBT from the n-hexane.

7. The method of claim 5, wherein the adsorbent comprises carbon nanotubes doped with nanoparticles of uranyl oxide, the hydrocarbon fluid is n-hexane, the sulfur compounds are dibenzothiophene (DBT), and wherein the adsorbent removes at least about 75% of the DBT from the n-hexane.

8. The method of claim 1, wherein the concentration of the adsorbent contacting the hydrocarbon fluid ranges from about 8 g/L to 20 g/L of the hydrocarbon fluid.

9. The method of claim 1, wherein the adsorbent is disposed in a fixed bed reactor or fluidized bed reactor and the contacting involves passing the hydrocarbon fluid through the fixed bed reactor or fluidized bed reactor.

10. The method of claim 9, wherein the fixed bed reactor comprises a cartridge.

11. The method of claim 10, wherein the cartridge further comprises at least one adsorbent selected from the group consisting of a zeolite, activated alumina, and activated carbon.

12. The method of claim 1, wherein the adsorbent has a form selected from the group consisting of a granule, a pellet, a sphere, a powder, a woven fabric, a non-woven fabric, a mat, a felt, a block, and a honeycomb.

13. The method of claim 1, wherein the carbon nanotubes have an outer diameter ranging from about 10 nm to 20 nm.

14. The method of claim 1, wherein the nanoparticles of uranyl oxide have a diameter ranging from about 10 nm to 80 nm.

15. The method of claim 1, wherein the adsorbent comprises activated carbon doped with nanoparticles of uranyl oxide, and wherein the activated carbon doped with the nanoparticles of uranyl oxide has a BET surface area of greater than about 900 $m^2/g$.

16. The method of claim 1, wherein the adsorbent comprises activated carbon doped with nanoparticles of uranyl oxide, and wherein the activated carbon doped with the nanoparticles of uranyl oxide has a total pore volume of greater than about 0.37 $cm^3/g$.

17. The method of claim 1, further comprising removing the sulfur compounds from the hydrocarbon fluid by at least one removal method selected from the group consisting of hydrodesulfurization, biodesulfurization, oxidative desulfurization, and adsorptive desulfurization using at least one other adsorbent.

18. The method of claim 1, wherein the hydrocarbon fluid is contacted with the adsorbent at a temperature of about 10-40° C. and a pressure of about 1-50 bar.

19. The method of claim 1, further comprising removing the adsorbent from the treated hydrocarbon fluid.

20. A method of removing sulfur compounds from a hydrocarbon fluid, comprising:
 (a) supplying the hydrocarbon fluid to a hydrotreating unit, the hydrotreating unit comprising a catalyst bed and a hydrogen gas source, said catalyst bed comprising a desulfurization catalyst, wherein contacting the hydrocarbon fluid with the desulfurization catalyst produces a partially desulfurized hydrocarbon fluid stream,
 (b) removing gaseous products from the partially desulfurized hydrocarbon fluid stream to produce a gas-free partially desulfurized hydrocarbon fluid stream,
 (c) then supplying the gas-free partially desulfurized hydrocarbon fluid stream after removing the gaseous products to at least one adsorption unit, said at least one adsorption unit comprising an adsorbent for the removal of the sulfur compounds, the adsorbent comprising at least one carbonaceous material selected from the group consisting of activated carbon and carbon nanotubes doped with nanoparticles of uranyl oxide ($UO_3$), wherein the adsorbent has a weight ratio of C to U in the range from 9:1 to 17:1, and a weight ratio of C to O in the range from 5:1 to 13:1, and
 (d) contacting the adsorbent with the gas-free partially desulfurized hydrocarbon fluid stream to substantially remove the sulfur compounds therefrom to produce a desulfurized hydrocarbon fluid stream.

\* \* \* \* \*